(12) United States Patent
Bhagavatula et al.

(10) Patent No.: US 11,274,056 B2
(45) Date of Patent: Mar. 15, 2022

(54) LASER SYSTEM AND METHOD FORMING A HIGH PURITY FUSED SILICA GLASS SHEET WITH MICRO-CRENELLATIONS

(71) Applicant: Corning Incorporated, Corning, NY (US)

(72) Inventors: Venkata Adiseshaiah Bhagavatula, Big Flats, NY (US); Daniel Warren Hawtof, Corning, NY (US); Xinghua Li, Horseheads, NY (US); Gary Edward Merz, Rochester, NY (US); John Stone, III, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 759 days.

(21) Appl. No.: 15/678,680

(22) Filed: Aug. 16, 2017

(65) Prior Publication Data
US 2018/0057388 A1   Mar. 1, 2018

Related U.S. Application Data

(60) Provisional application No. 62/378,701, filed on Aug. 24, 2016.

(51) Int. Cl.
*B32B 3/30* (2006.01)
*C03B 19/06* (2006.01)
(Continued)

(52) U.S. Cl.
CPC .......... *C03B 19/066* (2013.01); *C03B 33/082* (2013.01); *C03C 3/06* (2013.01);
(Continued)

(58) Field of Classification Search
CPC ....... C03B 19/01; C03B 19/06; C03B 19/066; C03B 20/00; C03B 2201/02; C03B 17/06; C03B 17/061; C03B 17/065; C03C 2201/02; H05K 2203/10; H05K 2203/107; H05K 3/0026; Y10T 428/24355; Y10T 428/24372; Y10T 428/24388;
(Continued)

(56) References Cited

U.S. PATENT DOCUMENTS 7,677,058 B2   3/2010   Hawtof et al.
8,062,733 B2   11/2011  Hawtof et al.
(Continued)

OTHER PUBLICATIONS

International Search Report and Written Opinion PCT/US2017/047282 dated Oct. 30, 2017.

*Primary Examiner* — Megha M Gaitonde
(74) *Attorney, Agent, or Firm* — Russell S. Magaziner

(57) ABSTRACT

A system and method for sintering a thin, high purity fused silica glass sheet having a thickness of 500 μm or less, includes a step of rastering a beam of a laser across a sheet of high purity fused silica soot; wherein a pattern of the rastering includes tightly spacing target locations on the sheet such that the laser sinters the soot and simultaneously forms tiny notches on a first major surface of the sheet when viewed in cross-section, wherein the tiny notches are crenellated such that at least some of the notches have generally flat bottom surfaces and at least some respective adjoining caps have generally plateau top surfaces offset from the bottom surfaces by steeply-angled sidewalls.

1 Claim, 23 Drawing Sheets

(51) Int. Cl.
*C03B 33/08* (2006.01)
*C03C 3/06* (2006.01)
*C03C 17/06* (2006.01)

(52) U.S. Cl.
CPC .......... *C03B 2201/02* (2013.01); *C03C 17/06* (2013.01); *C03C 2201/02* (2013.01); *C03C 2201/3488* (2013.01)

(58) Field of Classification Search
CPC ..... Y10T 428/24421; Y10T 428/24479; Y10T 428/24537; Y10T 428/2457; Y10T 428/24587; Y10T 428/24628; Y10T 428/24669; Y10T 428/24686; Y10T 428/24694; Y10T 428/24942; Y10T 428/2495
USPC ....... 428/141, 143, 145, 149, 156, 163, 167, 428/174, 179, 182, 184, 210, 212, 213, 428/220; 65/392, 414, 156, 17.3
See application file for complete search history.

(56) References Cited

U.S. PATENT DOCUMENTS

| | | |
|---|---|---|
| 8,181,485 B2 | 5/2012 | Coffey et al. |
| 8,359,884 B2 | 1/2013 | Hawtof |
| 9,296,614 B1 * | 3/2016 | Lal .......................... B01J 35/10 |
| 9,643,359 B2 | 5/2017 | Baumann et al. |
| 2002/0096106 A1 | 7/2002 | Kub et al. |
| 2006/0263994 A1 | 11/2006 | Forbes |
| 2010/0124709 A1 | 5/2010 | Hawtof et al. |
| 2011/0014445 A1 | 1/2011 | Hawtof |
| 2013/0052413 A1 | 2/2013 | Hawtof |
| 2015/0111007 A1 | 4/2015 | Hawtof et al. |
| 2016/0176756 A1 | 6/2016 | Lal et al. |

* cited by examiner

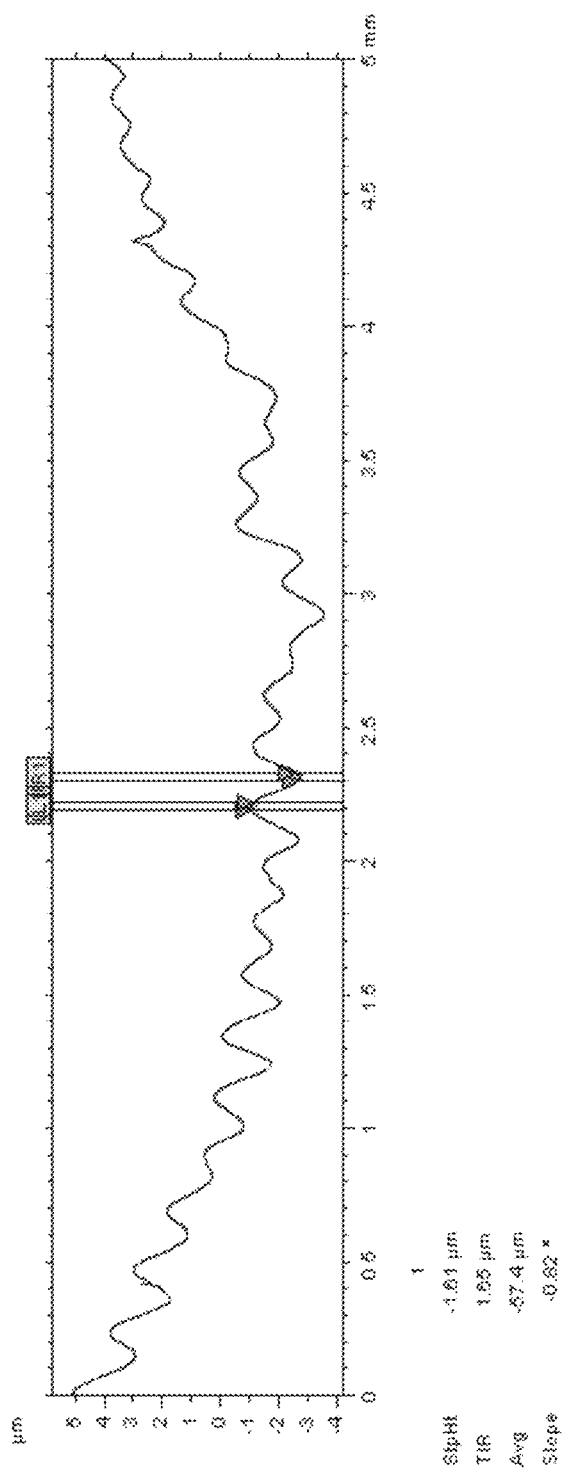
FIG. 8A Bottom Scan

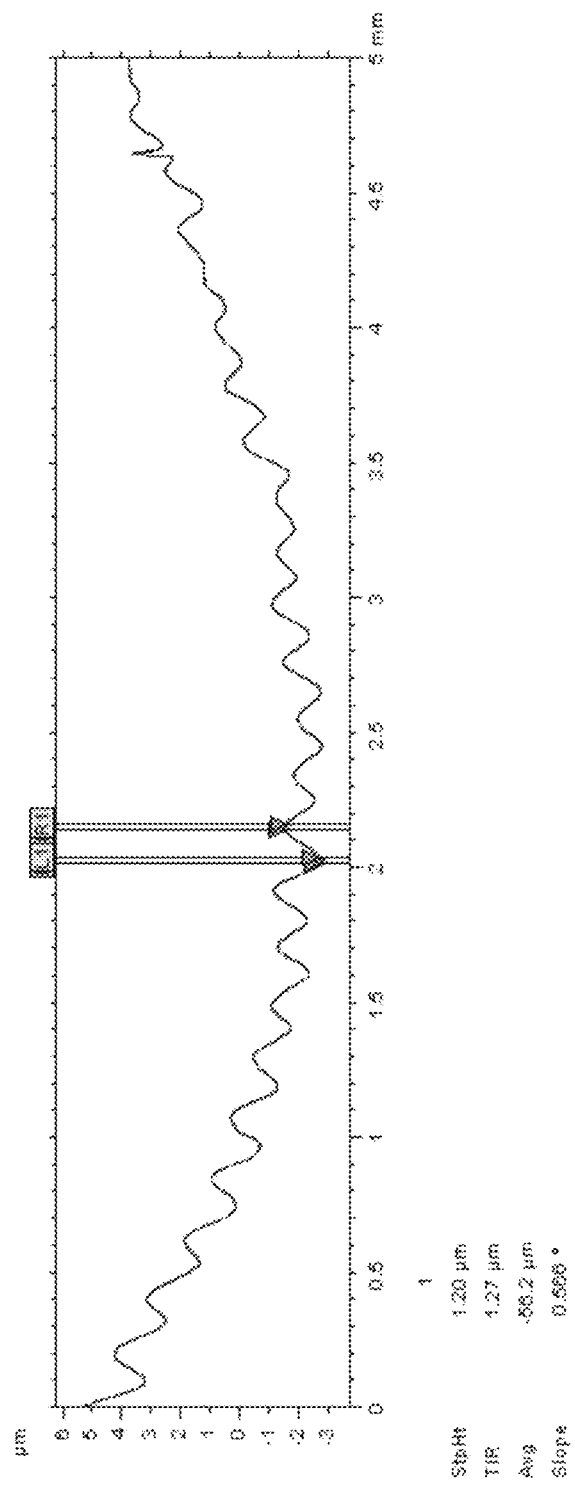
FIG. 8B Center Scan

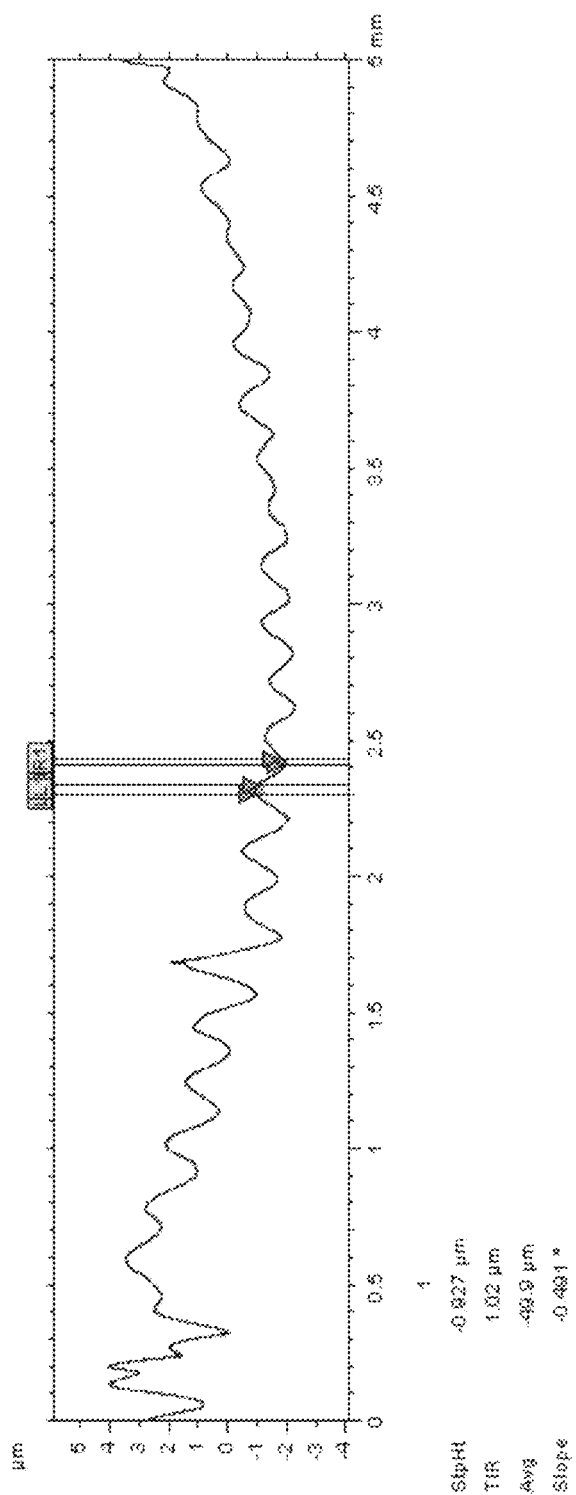
FIG. 8C Top Scan

FIG. 10

LASER SYSTEM AND METHOD FORMING A HIGH PURITY FUSED SILICA GLASS SHEET WITH MICRO-CRENELLATIONS

CROSS-REFERENCE TO RELATED APPLICATIONS

This application claims the benefit of priority under 35 U.S.C. § 119 of U.S. Provisional Application Ser. No. 62/376,701 filed on Aug. 18, 2016 the contents of which are relied upon and incorporated herein by reference in their entirety as if fully set forth below.

BACKGROUND

The disclosure relates generally to formation of silica-containing articles, and specifically to the formation of thin silica glass sheets. Silica soot may be generated by a process, such as flame hydrolysis. The silica soot may then be sintered to form a transparent or partially transparent glass sheet.

SUMMARY

Some embodiments of the disclosure relate to a high purity fused silica glass sheet that includes a first major surface and a second major surface opposite the first major surface. The sheet is at least 99.9 mole % silica, where the silica is at least generally amorphous, having less than 1% crystalline content by weight. An average thickness of the sheet between the first major surface and the second major surface is less than 500 µm. The first major surface, in cross section, has tiny notches along the first major surface, where the tiny notches each have a depth that is at least 25 nm and no more than 1 µm measured relative to a higher one of adjoining local caps on either side of the respective notch, the tiny notches each have a width between adjoining local caps that is at least 5 µm, and the tiny notches each have a length of at least 500 µm.

In some embodiments, the notches are crenellated such that at least some of the notches have generally flat bottom surfaces and at least some respective adjoining caps have generally plateau top surfaces offset from the bottom surfaces by steeply-angled sidewalls.

In some embodiments, at least 10 of the tiny notches that are each within 1000 µm of at least one other of the tiny notches along the first major surface.

In some embodiments, at least three notches that are side-by-side-by-side with one another in a row each have a depth that is within 20 percent of an average depth of the three notches.

In some embodiments, the tiny notches curve along the length thereof. In some such embodiments, the curve of the tiny notches turns at least 10-degrees off of a straight line. In some such embodiments, the curve turns at least 10-degrees and no more than 360-degrees in a distance of 500 µm along the length of the tiny notches. In some embodiments, the tiny notches, at the location of the turn, maintain separation from one another about the turn. In some embodiments, the tiny notches curve at least 90-degrees in a continuous turn along the length of the tiny notches. In some embodiments, the curve generally forms a polygon with rounded vertices.

In some embodiments, the notches each have a width between local caps that is at least 50 µm, and wherein the tiny notches each have a depth that is at least 100 nm and no more than 500 nm measured relative to the higher of the adjoining local caps on either side of the respective notch. In some such embodiments, the notches each have a length of at least 2500 µm.

Other embodiments of the disclosure relate to an electronic device, which includes a thin substrate that includes a high purity fused silica sheet having a thickness of 500 µm or less. The high purity fused silica sheet has notches on a major surface thereof, where notches are crenellated such that at least some of the notches have generally flat bottom surfaces and at least some respective adjoining caps have generally plateau top surfaces offset from the bottom surfaces by steeply-angled sidewalls. The electronic device further includes a metal layer coupled to the thin substrate and overlaying the notches, where an underside of the metal layer facing the crenellations is textured in a pattern that inversely relates to geometry of the crenellations such that caps on the major surface of the high purity fused silica sheet correspond to notches on the underside of the metal layer and notches on the underside of the metal layer correspond to caps on the major surface of the high purity fused silica sheet of the substrate.

In some embodiments, the notches are tiny, each having a depth that is at least 25 nm and no more than 1 µm measured relative to a higher one of adjoining local caps on either side of the respective notch, wherein the notches each have a width between adjoining local caps that is at least 5 µm, and wherein the notches each have a length of at least 500 µm.

In some embodiments, the metal layer directly contacts the thin substrate. In some such embodiments, the metal layer directly contacts the high purity fused silica sheet of the thin substrate.

In some embodiments, the thin substrate has a thickness of 200 µm or less.

In some embodiments, the high purity fused silica sheet has a porosity of less than 10% by volume.

Still other embodiments of the disclosure relate to a method of sintering a thin, high purity fused silica glass sheet having a thickness of 500 µm or less. The method includes a step of rastering a beam of a laser across a sheet of high purity fused silica soot. A pattern of the rastering includes tightly spacing target locations on the sheet such that the laser sinters the soot and simultaneously forms notches on a first major surface of the sheet when viewed in cross-section, where the notches are crenellated such that at least some of the notches have generally flat bottom surfaces and at least some respective adjoining caps have generally plateau top surfaces offset from the bottom surfaces by steeply-angled sidewalls. In some such embodiments, the wherein the notches are tiny, each having a depth that is at least 25 nm and no more than 1 µm measured relative to a higher one of adjoining local caps on either side of the respective notch, wherein the notches each have a width between adjoining local caps that is at least 5 µm, and wherein the notches each have a length of at least 500 µm.

In some embodiments, the pattern includes moving the beam of the laser in general polygon shapes, wherein vertices of the polygon shapes are rounded.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 8A-8C are atomic force microscopy profile scans of the glass sheet surface shown in FIG. 7 according to an exemplary embodiment.

FIG. 10 shows magnified surface images surfaces of laser sintered silica glass sheets formed via various laser sintering processes according to exemplary embodiments.

DETAILED DESCRIPTION

Referring generally to the figures, various embodiments of a sintered silica glass sheet/material as well as related systems and methods are shown. In various embodiments, the system and method disclosed herein utilizes one or more glass soot generating device (e.g., a flame hydrolysis burner) that is directed or aimed to deliver a stream of glass soot particles on to a soot deposition device or surface forming a glass soot sheet. The soot sheet is then sintered using a laser forming a silica glass sheet. In general, the laser beam is directed onto the soot sheet such that the soot densifies forming a fully sintered or partially sintered silica glass sheet. In various embodiments, the configuration and/or operation of the glass soot generating device, the soot deposition surface and/or the sintering laser are configured to form a sintered glass sheet having very high surface smoothness as compared to some sintered silica glass sheets formed from sintered silica soot (e.g., as compared to furnace and torch processes, and some other laser sintering processes). In some embodiments, the glass sheet formation process discussed herein forms a silica glass sheet having surface characteristics that are distinct from the surface characteristic of a polished silica surface such a polished, silica boule surface.

Further, the configuration and/or operation of the glass soot generating device, the soot deposition surface and/or the sintering laser are configured to form a sintered glass sheet having very low levels of certain contaminants (e.g., sodium (Na), surface hydroxyl groups, etc.) commonly found in silica materials formed using some other methods. Applicant has found that by using the laser sintering process and system discussed herein, sintered silica glass sheets can be provided with a high surface smoothness and low contaminant content without requiring additional polishing steps in some embodiments.

Figure 1:
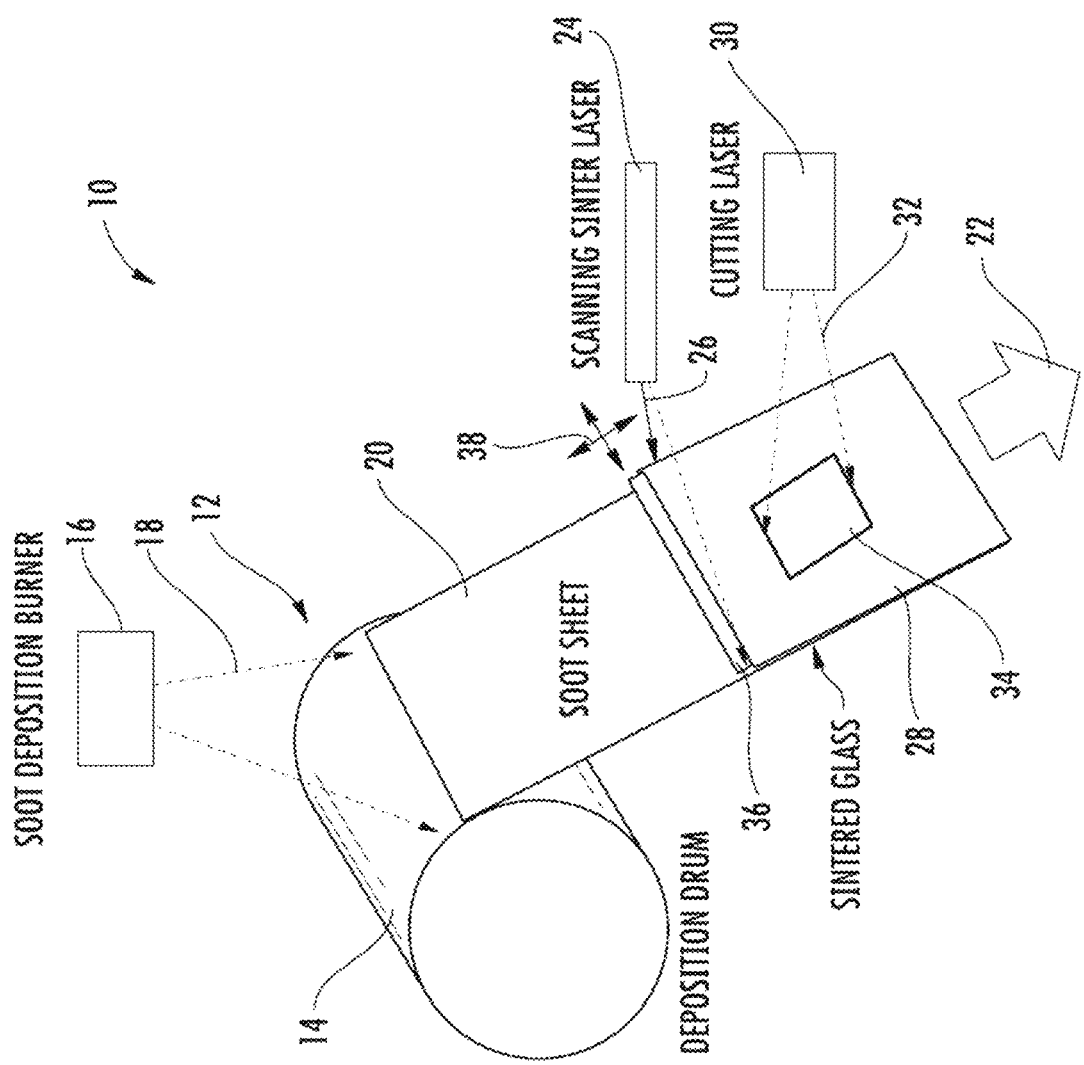
FIG. 1 shows a laser sintering system according to an exemplary embodiment.

Referring to FIG. 1, a system and method for forming a high purity, high smoothness silica glass sheet is shown according to an exemplary embodiment. As shown in FIG. 1, system 10 includes a soot deposition device, shown as deposition drum 12, having an outer deposition surface 14. System 10 includes a soot generating device, shown as soot burner 16 (e.g., a flame hydrolysis burner), that directs a stream of glass soot particles 18 onto deposition surface 14 forming glass soot sheet 20.

As shown in FIG. 1, drum 12 rotates in the clockwise direction such that soot sheet 20 is advanced off of drum 12 in a processing direction indicated by the arrow 22 and advanced past sintering laser 24. In some embodiments, soot sheet 20 is in tension (e.g., axial tension) in the direction of arrow 22. In specific embodiments, soot sheet 20 is only in tension (e.g., axial tension) in the direction of arrow 22 such that tension is not applied widthwise across soot sheet 20. Applicant was surprised to identify that widthwise tensioning of the soot sheet during sintering was not needed to maintain the surface characteristics, specifically roughness, discussed herein. However, in at least some other embodiments, soot sheet 20 is tensioned in the widthwise direction. In some embodiments, tensioning in different directions is selected to control the bow or warp of the sintered soot sheet.

As will be explained in more detail below, sintering laser 24 generates a laser beam 26 toward soot sheet 20, and the energy from laser beam 26 sinters glass soot sheet into a partially or fully sintered glass sheet 28. As will be understood, the energy from sintering laser beam 26 causes the densification of glass soot sheet 20 into a partially or fully sintered glass sheet 28. Specifically, laser sintering of silica soot sheet 20 uses laser 24 to rapidly heat soot particles to temperatures above the soot melting point, and as a result of reflow of molten soot particles a fully dense, thin silica glass sheet 28 is formed.

In various embodiments, soot sheet 20 has a starting density between 0.2 g/cc to 0.8 g/cc, and silica glass sheet 28 is a fully sintered silica glass sheet having a density of about 2.2 g/cc (e.g., 2.2 g/cc plus or minus 1%). As will be explained in more detail below, in some embodiments, silica glass sheet 28 is a fully sintered silica glass sheet including voids or bubbles such that the density of the sheet is less than 2.2 g/cc. In various other embodiments, soot sheet 20 has a starting density between 0.2 g/cc to 0.8 g/cc, and silica glass sheet 28 is a partially sintered silica glass sheet having a density between 0.2 g/cc and 2.2 g/cc.

In various embodiments, sintered glass sheet 28 has length and width between 1 mm and 10 m, and in specific embodiments, at least one of the length and width of sintered glass sheet 28 is greater than 18 inches. It is believed that in various embodiments, system 10 allows for formation of sintered glass sheet 28 having length and/or width dimensions greater than the maximum dimensions of silica structures formed by other methods (e.g., silica boules which are typically limited to less than 18 inches in maximum dimension).

System 10 is configured to generate a soot sheet 20 having a smooth surface topology which translates into glass sheet 28 also having a smooth surface topology. In various embodiments, soot burner 16 is positioned a substantial distance from and/or at an angle relative to drum 12 such that soot streams 18 form a soot sheet 20 having a smooth upper surface. This positioning results in mixing of soot streams 18 prior to deposition onto surface 14. In specific embodiments, the outlet nozzles of soot burner 16 are positioned between 1 inch and 12 inches, specifically 1 inch to 4 inches, and more specifically about 2.25 inches, from deposition surface 14, and/or are positioned at a 30-45 degree angle relative to soot deposition surface 14. In specific embodiments, soot stream 18 can be directed to split above and below drum 12 with exhaust, and in other embodiments, soot stream 18 is directed only to one side of drum 12. In addition, the velocity of soot streams 18 leaving burner 16 may be relatively low facilitating even mixing of soot streams 18 prior to deposition onto surface 14. Further, burner 16 may include a plurality of outlet nozzles, and burner 16 may have a large number of small sized outlet nozzles acting to facilitate even mixing of soot streams 18 prior to deposition onto surface 14. In addition, burner 16 may be configured to better mixing of constituents and soot within channels inside the burners such as via a venturi nozzle and flow guides that generate intermixing and eddies. In some embodiments, these structures may be formed via 3D printing.

In various embodiments, laser 24 is configured to further facilitate the formation of glass sheet 28 having smooth surfaces. For example in various embodiments, sintering laser 24 is configured to direct laser beam 26 toward soot sheet 20 forming a sintering zone 36. In the embodiment shown, sintering zone 36 extends the entire width of soot sheet 20. As will be discussed in more detail below, laser 24 may be configured to control laser beam 26 to form sintering zone 36 in various ways that results in a glass sheet 28 having smooth surfaces. In various embodiments, laser 24 is configured to generate a laser beam having an energy density that sinters soot sheet 20 at a rate that forms smooth surfaces.

In various embodiments, laser 24 generates a laser beam having an average energy density between 0.001 J/mm$^2$ and 10 J/mm$^2$, specifically 0.01 J/mm$^2$ and 10 J/mm$^2$, and more specifically between 0.03 J/mm$^2$ and 3 J/mm$^2$ during sintering. In some embodiments, laser 24 may be suited for sintering particularly thin soot sheets (e.g., less than 200 μm, 100 μm, 50 μm, etc. thick), and in such embodiments, laser 24 generates a laser beam having an average energy density between 0.001 J/mm$^2$ and 0.01 J/mm$^2$.

In other embodiments, system 10 is configured such that relative movement between soot sheet 20 and laser 24 occurs at a speed that facilitates formation of glass sheet 28 with smooth surfaces. In general, the relative speed in the direction of arrow 22 is between 0.1 mm/s and 10 m/s. In various embodiments, the relative speed in the direction of arrow 22 is between 0.1 mm/s and 10 mm/s, specifically between 0.5 mm/s and 5 mm/s, and more specifically between 0.5 mm/s and 2 mm/s. In various embodiments, system 10 is a high speed sintering system having a relative speed in the direction of arrow 22 between 1 m/s and 10 m/s.

As shown in FIG. 1, in one embodiment, laser 24 utilizes dynamic beam shaping to form sintering zone 36. In this embodiment, laser beam 26 is rapidly scanned over soot sheet 20 generally in the direction of arrows 38. The rapid scanning of laser beam 26 emulates a line-shaped laser beam generally in the shape of sintering zone 36. In a specific embodiment, laser 24 utilizes a two-dimensional galvo scanner to scan laser beam 26 forming sintering zone 36. Using a two-dimensional galvo scanner, laser beam 26 can be rastered across the entire width of soot sheet 20 or across a specific subarea of soot sheet 20. In some embodiments, laser beam 26 is rastered as soot sheet 20 is translated in the direction of arrow 22. During the sintering process the rastering speed may vary depending on the desired sintering characteristics and surface features. In addition, the rastering pattern of laser beam 26 may be linear, sinusoidal, unidirectional, bidirectional, zig-zag, etc., in order to produce sheets with designed and selected flatness, density or other attributes. In such embodiments, laser 24 may use galvo, polygonal, piezoelectric scanners and optical laser beam deflectors such as AODs (acousto-optical deflectors) to scan laser beam 26 to form sintering zone 36.

In a specific embodiment using a dynamic laser beam shaping to form sintering zone 36, a $CO_2$ laser beam was scanned bi-directionally at a speed of 1500 mm/s. The $CO_2$ laser beam has a Gaussian intensity profile with 1/e$^2$ diameter of 4 mm. The step size of the bi-directional scan was 0.06 mm. At settings of scan length of 55 mm and a laser power of 200 W, a soot sheet 20 of roughly 400 μm in thickness was sintered into a silica glass sheet 28 of ~100 μm thickness. The effective sintering speed was ~1.6 mm/s, and the sintering energy density was 0.65 J/mm$^2$.

In some embodiments, the dynamic laser beam shaping and sintering approach enables laser power modulation on-the-fly while the laser beam is scanned. For example, if the scanning laser beam has a sinusoidal speed profile, a controller can send a sinusoidal power modulation signal to the laser controller in order to maintain a constant laser energy density on soot sheet 20 within sintering zone 36.

Figure 2:
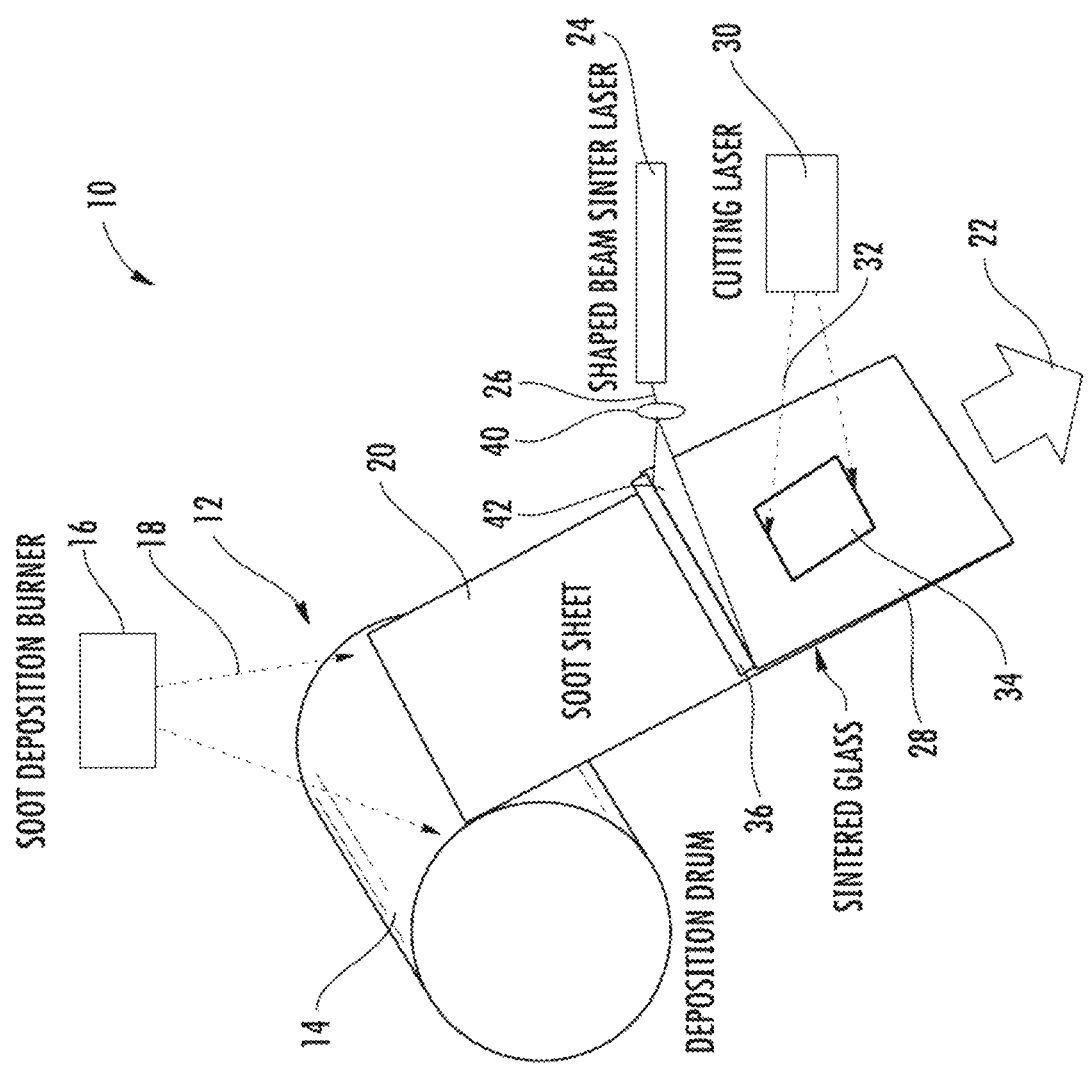
FIG. 2 shows a laser sintering system according to another exemplary embodiment.

As shown in FIG. 2, in one embodiment, laser 24 utilizes a geometrical/diffractive approach to beam shaping to form sintering zone 36. In this embodiment, laser 24 is utilized in combination with a shaping system 40 to transform laser beam 26 into an elongate laser beam 42. In various embodiments, shaping system 40 may include one or more optical element, such as lenses, prisms, mirrors, diffractive optics, etc. to form elongate laser beam 42. In various embodiments, elongate laser beam 42 has a uniform intensity distribution in the width direction across soot sheet 20. In various embodiments, shaping system 40 may be configured to generate an elongate laser beam 42 having a width between 1 mm and 10 m, and a height between 0.5 mm and 10 mm.

In a specific embodiment using geometrical/diffractive laser beam shaping to form sintering zone 36, a $CO_2$ laser beam of 12 mm in diameter was expanded using a beam expander of Galilean design. The expanded laser beam is about 50 mm in diameter. The expanded laser beam was then transformed into a line shape using an asymmetric aspheric lens with a focal length of ~300 mm. The line-shaped laser beam has a dimension of 55 mm×2 mm. The laser power density, which is defined as laser power divided by area, is 1.8 W/mm$^2$. During the sintering process, the line-shaped laser beam is kept stationary while soot sheet 20 was translated. At a laser power of 200 W, a soot sheet 20 of roughly 400 μm in thickness was sintered into a silica glass sheet 28 of ~100 μm thickness at a speed of 1.5 mm/s. The corresponding energy density for sintering is 1.0 J/mm$^2$.

In various embodiments, laser 24 can be a laser at any wavelength or pulse width so long as there is enough absorption by the soot particles to cause sintering. The absorption can be linear or nonlinear. In a specific embodiment, laser 24 is a $CO_2$ laser. In another embodiment, laser 24 may be a CO laser with a wavelength of around 5 μm. In such embodiments, a CO laser 24 can penetrate deeper into soot sheet 20, and thus a CO laser 24 may be used to sinter thicker soot sheets 20. In various embodiments, the penetration depth of a $CO_2$ laser 24 in silica soot sheet 20 is less than 10 μm, while the penetration depth of the CO laser is ~100 μm. In some embodiments, soot sheet 20 may be pre-heated from the backside, for example, using a resistive heater, an IR lamp, etc, to further increase the depth of sintering formed via laser 24.

In some embodiments, system 10 is configured to maintain a constant sintering temperature during the laser sintering process. This can be achieved by adding temperature sensors along the sintering line. The temperature sensor data can be used to control the laser power in order to maintain constant sintering temperature. For example, a series of germanium or silicon detectors can be installed along the sintering line. The detector signals are read by a controller. The controller can process the signals and use the info to control the laser output power accordingly.

Figure 3:
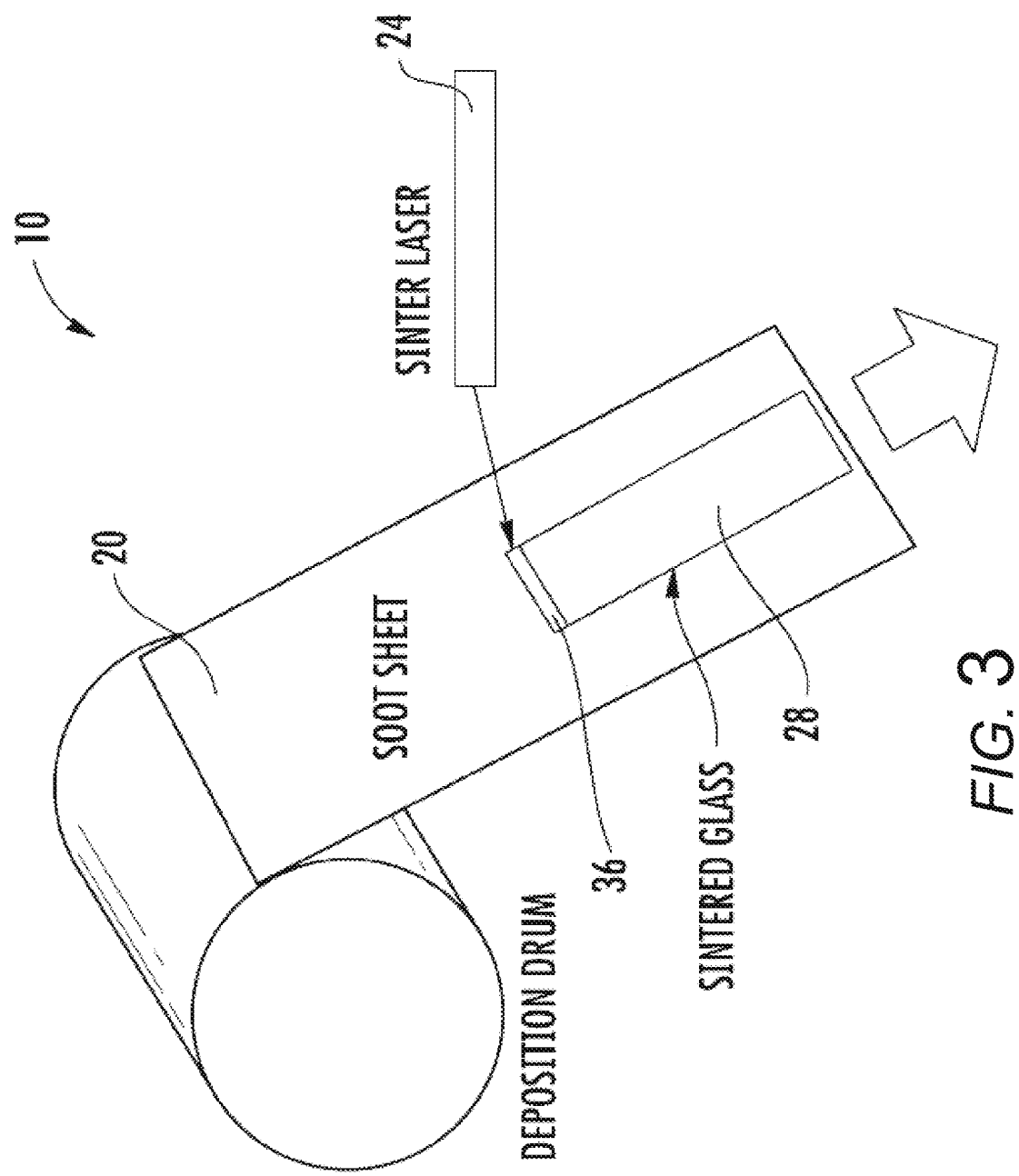
FIG. 3 shows a laser sintering system according to another exemplary embodiment.
Figure 4:
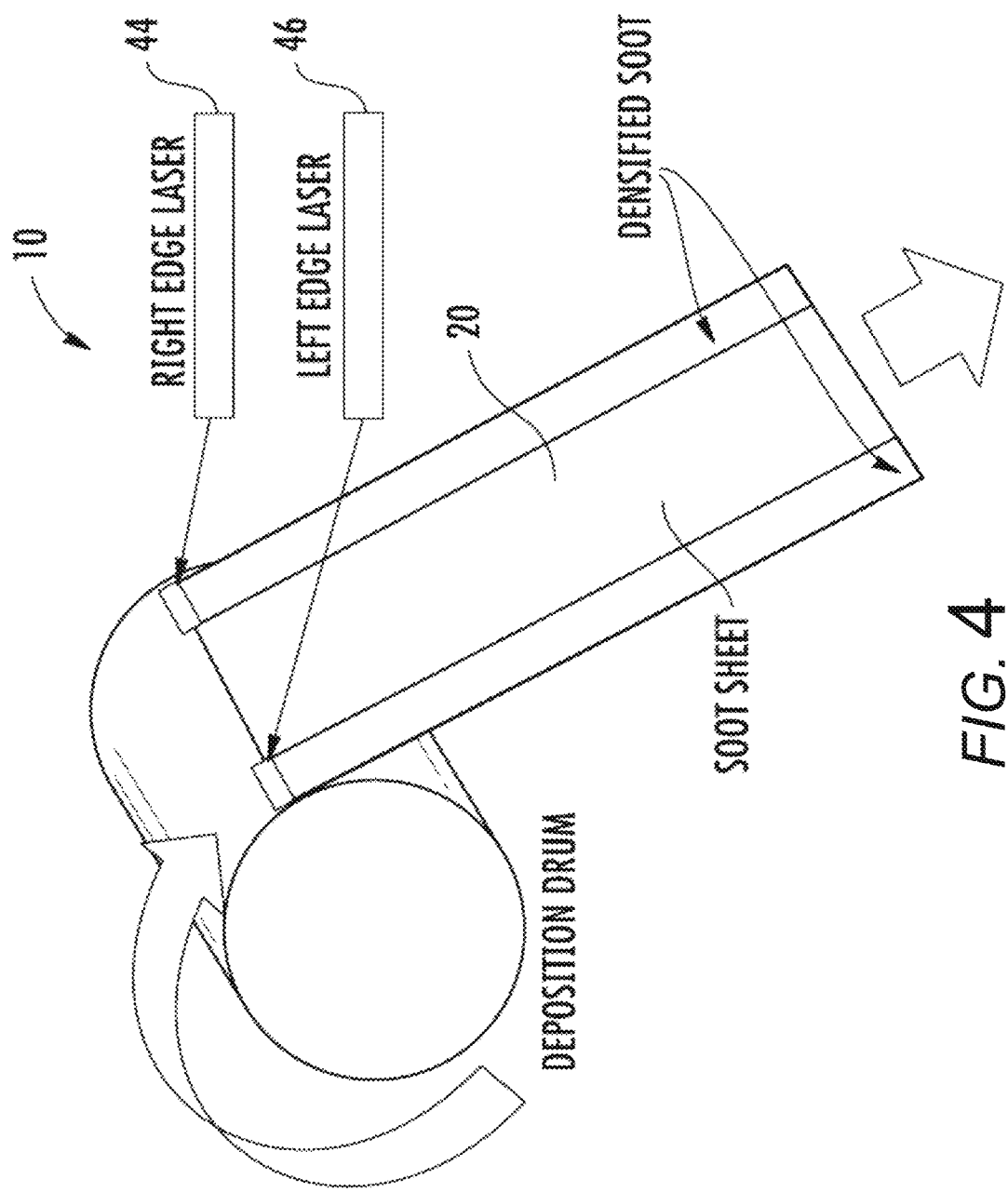
FIG. 4 shows a laser sintering system according to another exemplary embodiment.

Referring to FIG. 3, in one embodiment, laser 24 may be configured to generate sintering zone 36 that does not extend the entire width of soot sheet 20. In some such embodiments, the smaller sintering zone 36 may result in lower unintended heating of equipment adjacent laser 24 and/or soot sheet 20. Referring to FIG. 4, in various embodiments, system 10 may include additional lasers 44 and 46 that are configured to fully or partially sinter edge portions of soot sheet 20. This may facilitate handling of soot sheet 20 during laser sintering to form sintered sheet 28.

In contrast to some silica glass formation processes (e.g., boule formation processes), system 10 is configured to produce silica glass sheet 28 having very high purity levels with very low thicknesses. In various embodiments, silica glass sheet 28 has a thicknesses (i.e., the dimension perpendicular to the major and minor surfaces) of less than 500 μm, of less than 250 μm, of less 150 μm and of less than 100 μm. Further, in various embodiments, silica glass sheet 28 is least 99.9 mole % silica, and specifically at least 99.99 mole % silica. In addition, silica glass sheet 28 is formed having very low levels of contaminant elements common in silica glass formed by other methods. In specific embodiments, silica glass sheet 28 has a total sodium (Na) content of less than 50 ppm. In various embodiments, the sodium content of silica glass sheet 28 is substantially consistent throughout sheet 28 such that the total sodium content is less than 50 ppm at all depths within silica glass sheet 28. This low total sodium content and the even sodium distribution is in contrast to some silica structures (e.g., silica boules) which have higher overall sodium content that varies at different depths within the boule. In various embodiments, it is believed that the low sodium content discussed herein provides glass sheet 28 with optical loss reduction, index of refraction uniformity and chemical purity/non-reactivity as compared to other silica materials with higher sodium content.

In other embodiments, silica glass sheet 28 has a low level of hydroxyl (OH) concentration. In various embodiments, the OH concentration can be controlled to impact the viscosity, refractive properties, and other properties of silica glass sheet 28. In various embodiments, beta OH is less than 0.02 abs/mm and more specifically is less than 0.002 abs/mm. In some embodiments, the OH concentration of silica glass sheet 28 formed using laser sintering system 10 is less than the OH concentration of silica material formed using some other formation methods (e.g., plasma sintering, flame sintering and/or sintering process that dry using chlorine prior to sintering). In contrast to some silica materials that utilize a surface treatment with a material such as hydrofluoric acid, silica glass sheet 28 has a low surface halogen concentration and a low surface OH concentration.

In various embodiments, sintered silica glass sheet 28 has a fictive temperature (Tf) that is higher than the Tf of at least some silica materials, such as silica boules. For example, it is believed that at least in some embodiments, sintered silica glass sheet 28 has a fictive temperature between 1100 degrees C. and 2000 degrees C., specifically between 1500 degrees and 1800 degrees C., and more specifically between 1600 degrees C. and 1700 degrees C. In a specific embodiment, sintered silica glass sheet 28 has a fictive temperature of about 1635 degrees C. (e.g., 1635 degrees C. plus or minus 1%), such as relative to fully-annealed such glass.

Figure 5:
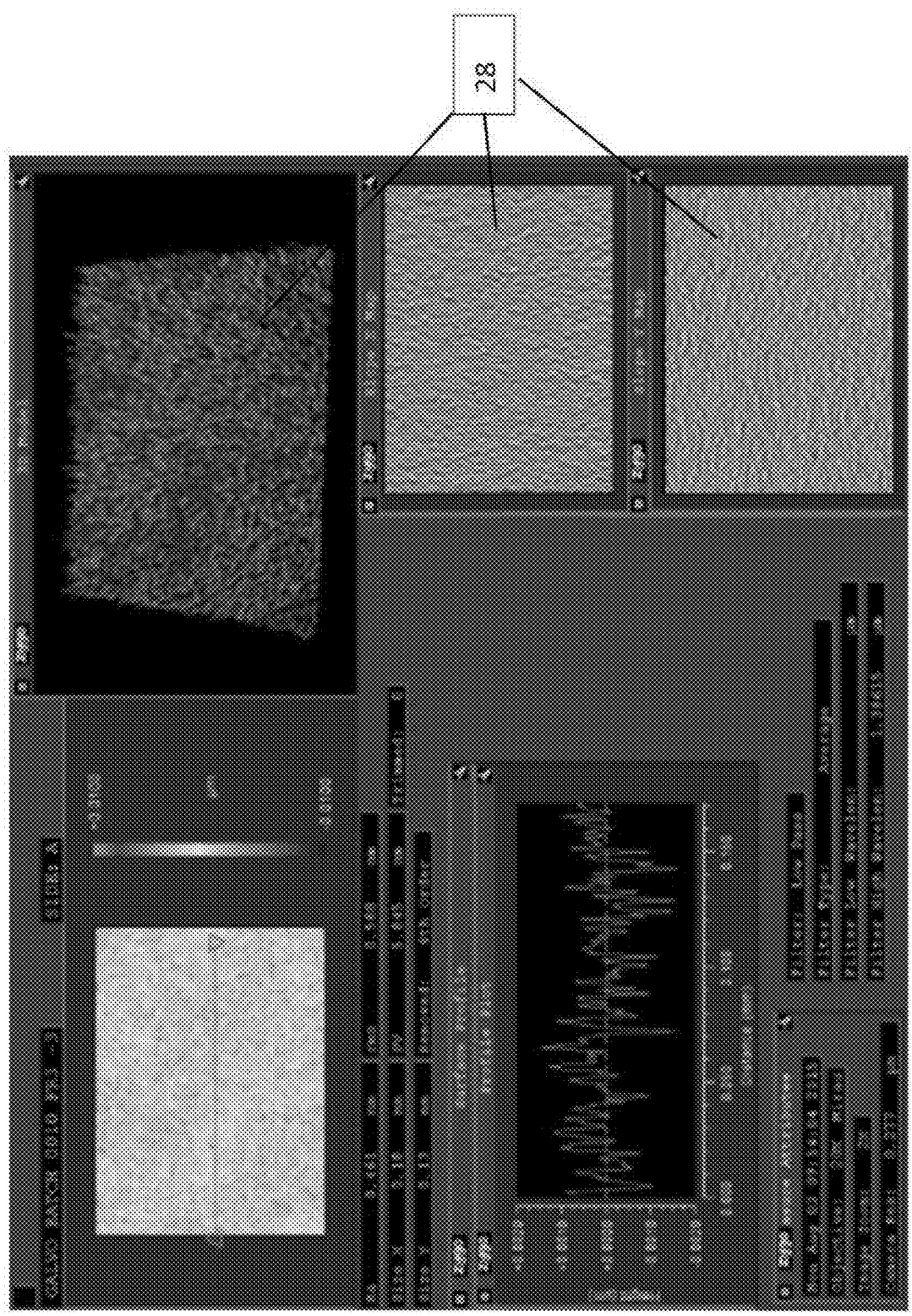
FIG. 5 shows the output from a Zygo optical profiler measuring the surface of a laser sintered silica glass sheet formed via laser sintering according to an exemplary embodiment.
Figure 6:
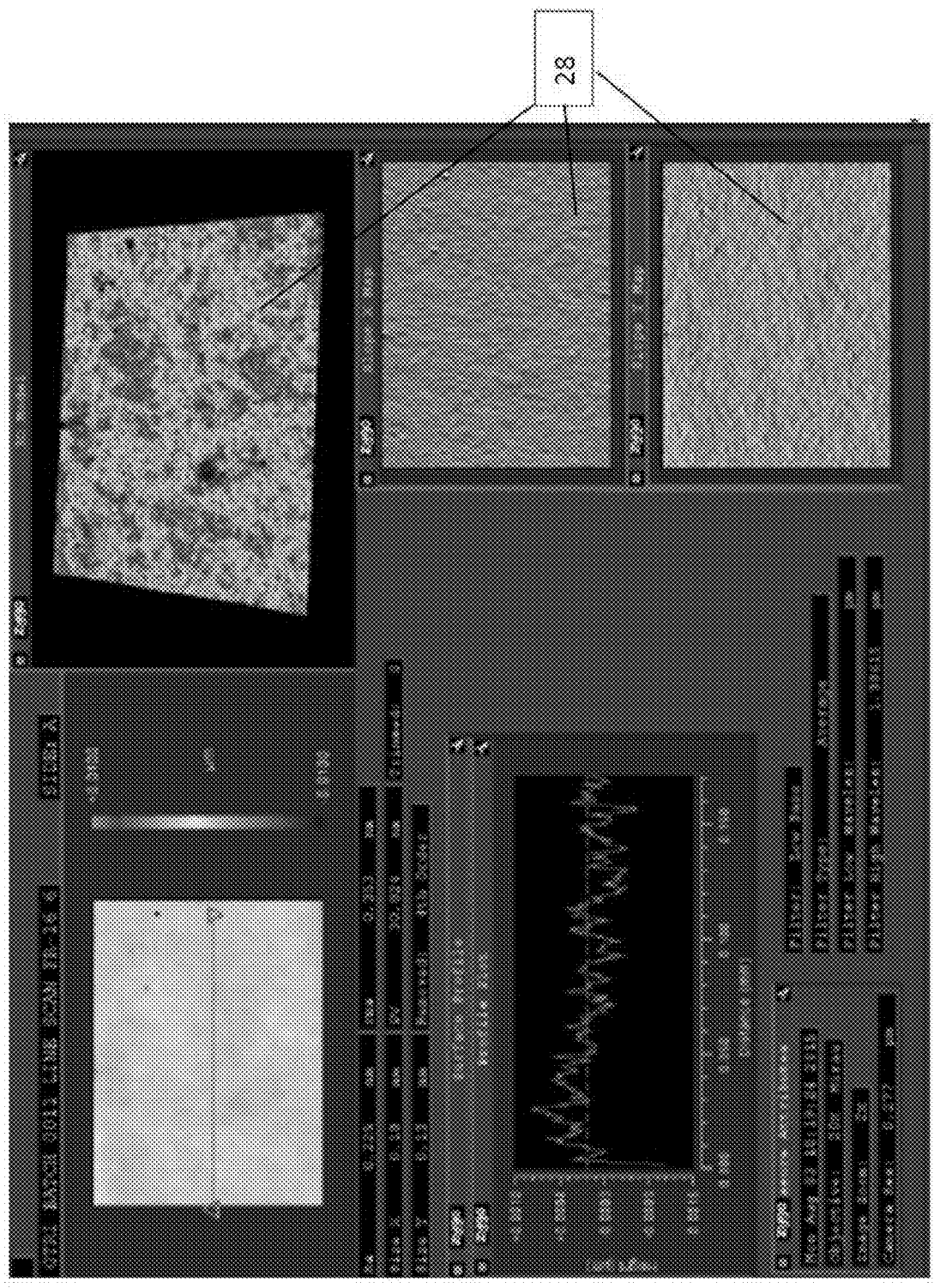
FIG. 6 shows the output from a Zygo optical profiler measuring the surface of a laser sintered silica glass sheet formed via laser sintering according to another exemplary embodiment.
Figure 7:
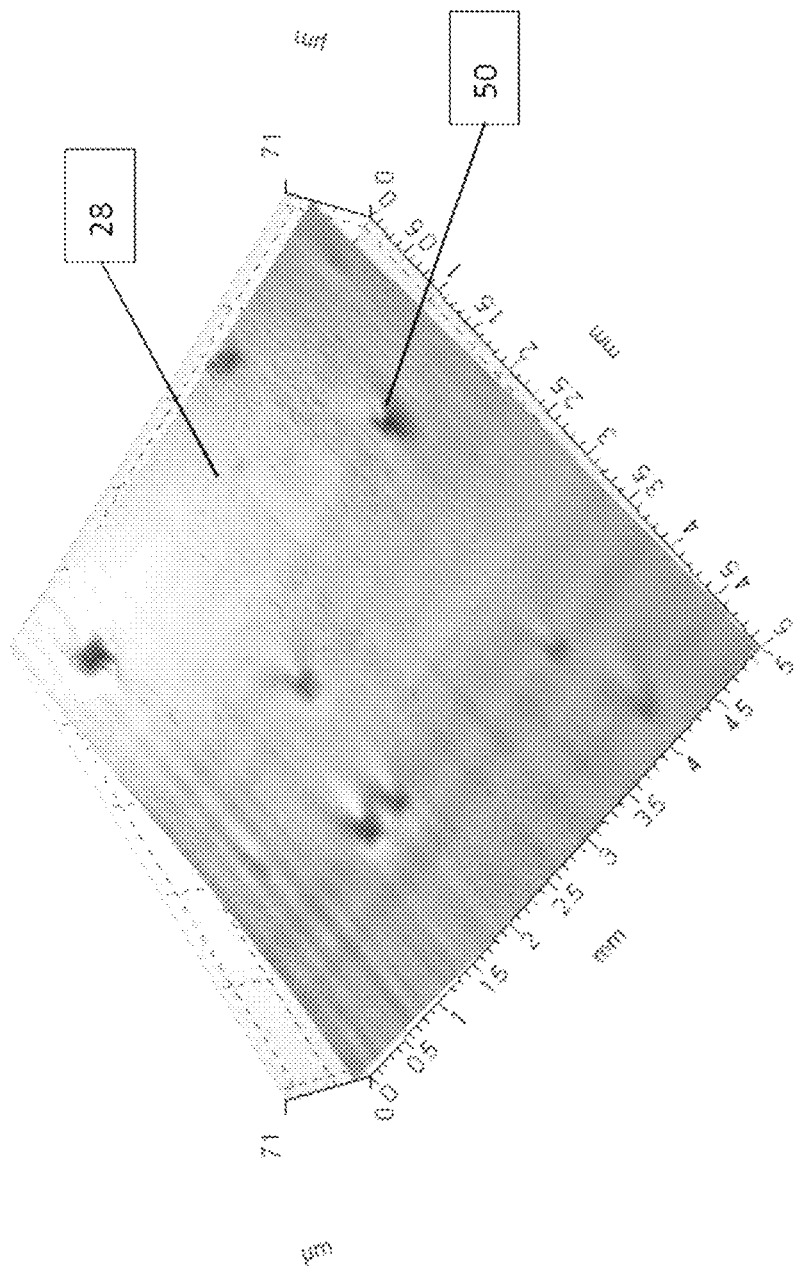
FIG. 7 is a 3D micro-scale representation of a measured profile of a surface of a laser sintered silica glass sheet formed via laser sintering according to an exemplary embodiment.

Referring to FIGS. 5-8C, characteristics of the surface profile, topology and roughness of sintered glass sheet 28 are shown according to exemplary embodiments. FIG. 5 shows a Zygo optical profile scan of an embodiment of silica glass sheet 28 formed using a galvo based scanning laser system, such as that shown in FIG. 1. FIG. 6 shows a Zygo optical profile scan of an embodiment of silica glass sheet 28 formed using a geometrical/diffractive laser beam shaping, such as that shown in FIG. 2. FIG. 7 is a 3D micro-scale representation of a measured profile of a surface of an embodiment of silica glass sheet 28 according to an exemplary embodiment. FIGS. 8A-8C show an atomic force microscopy AFM line scans of the surface of the silica glass 28 taken widthwise at three different positions along the length of glass sheet 28 shown in FIG. 7.

In various embodiments, sintered glass sheet 28 has opposing first and second major surfaces, at least one of which has a high level of smoothness. In various embodiments, the roughness (Ra) of at least one of the first major surface and the second major surface of sintered glass sheet 28 is between 0.025 nm and 1 nm, specifically between 0.1 nm and 1 nm and specifically between 0.025 nm and 0.5 nm, over at least one 0.023 mm$^2$ area. In one such embodiment, Ra is determined using a Zygo optical profile measurement as shown in FIGS. 5 and 6, and specifically determined using the Zygo with a 130 μm×180 μm spot size. In some embodiments, the roughness (Ra) of at least one of the first major surface and the second major surface of sintered glass sheet 28 is between 0.12 nm and 0.25 nm as measured using AFM over a 2 μm line scan, as shown in FIGS. 8A-8C. In specific embodiments, sintered glass sheet 28 has a low roughness level on a small scale measurement, and a larger roughness level with a larger scale measure. In various embodiments, the roughness (Ra) of at least one of the first major surface and the second major surface of sintered glass sheet 28 is between 0.025 nm and 1 nm over at least one 0.023 mm$^2$ area, and an Ra of between 1 μm and 2 μm using a profilometer and a scan length of 5 mm.

As shown in FIGS. 5-8C, while the major surfaces of sintered glass sheet 28 are smooth, the surfaces do have a nanoscale surface topology including series of raised and recessed features. In the embodiments discussed herein, the raised and recessed features are relatively small contributing to the low surface roughness. In various embodiments, each raised feature has a maximum peak height that is between 0.1 μm and 10 μm, an specifically between 1 μm and 2 μm, relative to the average or baseline height of the topology as measured using a profilometer and a scan length of 5 mm. In specific embodiments, the topology of one or more surface of glass sheet 28 is such that the maximum vertical distance between the bottom of a recessed feature (e.g., a valley) and the top of a raised feature (e.g., a peak) is between 1 nm and 100 nm within at least one 0.023 mm$^2$ area as measured by a Zygo optical profile measurement. Table 1 shows roughness data from an AFM scan of a surface of a sintered glass sheet 28 according to an exemplary embodiment.

TABLE 1

Roughness Measurements

| Scan No./Sample No. | scan size | Rq (nm) | Ra (nm) | Skewness | Kurtosis |
|---|---|---|---|---|---|
| Scan 1 - Sample 1 | 500 nm | 0.164 | 0.131 | −0.00552 | 3.03 |
| Scan 2 - Sample 1 | 500 nm | 0.173 | 0.138 | −0.0925 | 3.08 |
| Scan 3 - Sample 1 | 500 nm | 0.16 | 0.129 | 0.043 | 2.91 |
| Scan 4 - Sample 1 | 500 nm | 0.178 | 0.142 | 0.00239 | 3 |
| Scan 5 - Sample 1 | 500 nm | 0.164 | 0.131 | −0.00533 | 2.97 |
| Scan 6 - Sample 1 | 2 um | 0.219 | 0.174 | 0.0273 | 3 |
| Scan 7 - Sample 1 | 2 um | 0.196 | 0.156 | 0.0218 | 3 |
| Scan 8 - Sample 1 | 2 um | 0.204 | 0.162 | −0.0261 | 3.11 |
| Scan 9 - Sample 1 | 2 um | 0.202 | 0.161 | 0.0227 | 2.96 |
| Scan 1 - Sample 2 | 500 nm | 0.182 | 0.143 | 0.225 | 3.91 |
| Scan 2 - Sample 2 | 500 nm | 0.175 | 0.138 | 0.142 | 3.35 |
| Scan 3 - Sample 2 | 500 nm | 0.181 | 0.142 | 0.424 | 6.09 |
| Scan 4 - Sample 2 | 2 um | 0.215 | 0.167 | 0.685 | 12.1 |
| Scan 5 - Sample 2 | 2 um | 0.223 | 0.172 | 1.07 | 20.4 |
| Scan 6 - Sample 2 | 2 um | 0.231 | 0.179 | 0.705 | 11.1 |

As shown best in FIG. 7, silica glass sheet 28 may include a plurality of voids or bubbles. In various embodiments, some of the voids or bubbles may be located on the surface of silica glass sheet 28, forming depressions 50 shown in FIG. 7, and other bubbles or voids may be located within an internal area of the sintered silica material of silica glass sheet 28. In such embodiments, the bubbles or voids result in sheet 28 having a bulk density less than the maximum density of sintered silica without voids or bubbles. In various embodiments, sintered silica glass sheet 28 is a fully sintered silica sheet (e.g., one with a low amount or no unsintered silica soot particles) that has a density greater than 1.8 g/cc and less than 2.2 g/cc and specifically less than 2.203 g/cc (e.g., the maximum density of fully sintered silica without any voids or bubbles). In such embodiments, soot sheet 20 may have a starting density of between 0.2 g/cc to 0.8 g/cc, and through interaction with laser beam 26, soot sheet 20 densities into fully sintered glass silica sheet that has a density greater than 1.8 g/cc and less than 2.203 g/cc, and more specifically between 1.8 g/cc and less than 2.15 g/cc. In various embodiments, formation of bubbles, voids or surface depressions 50 may be controlled via control of laser operation and may also be formed from impact with particulate matter traveling from soot burner 16. In various embodiments, voids within silica glass sheet 28 and specifically depressions 50 may be advantageous in applications such as a substrate for carbon nanotube (CNT) growth where depressions 50 act to hold CNT catalyst.

Figure 9:
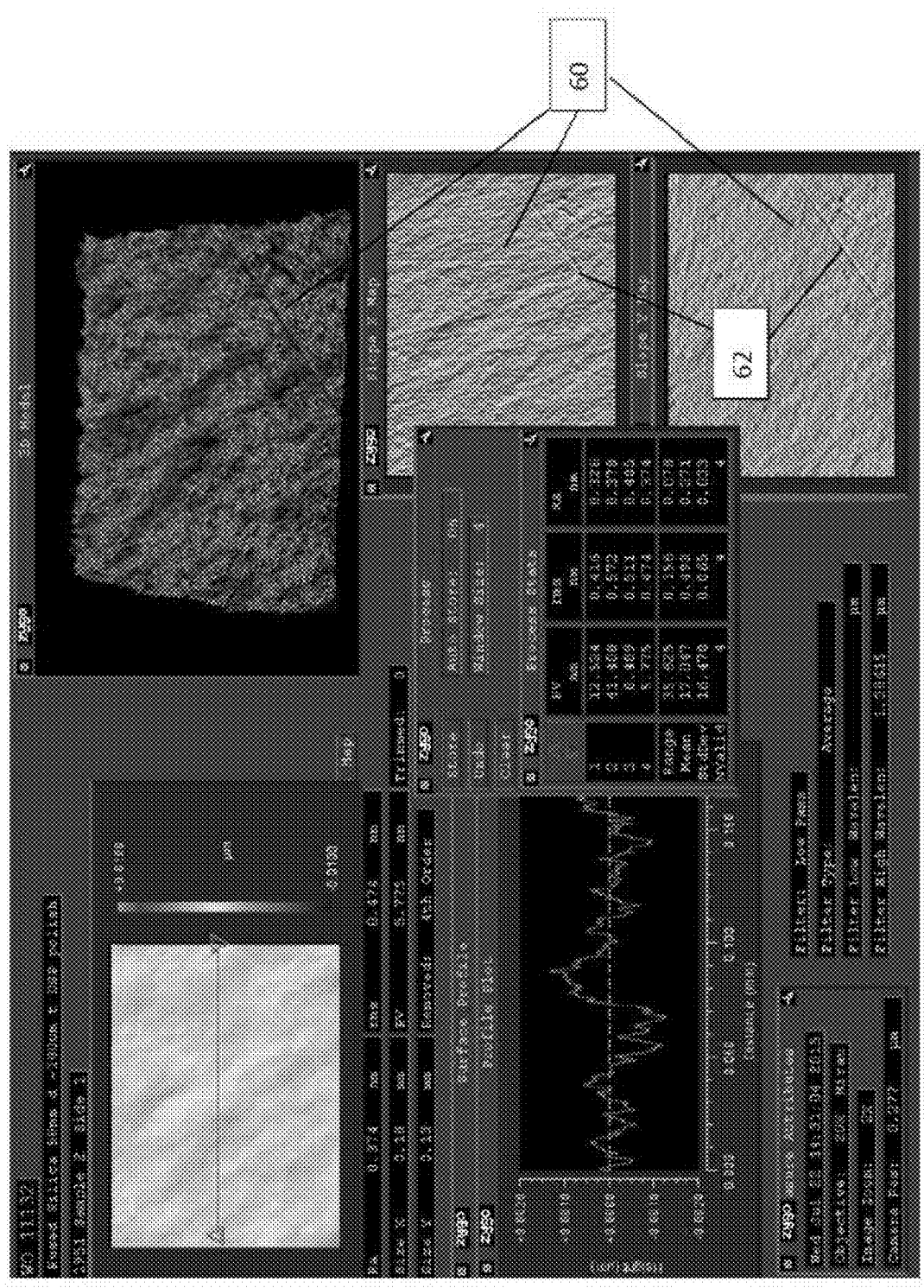
FIG. 9 shows a comparative output from a Zygo optical profiler measuring the surface of a non-laser sintered silica material following surface polishing.

For comparison, FIG. 9 shows a Zygo plot of a polished silica boule 60 formed from a non-laser sintering process, specifically a sliced and polished section from a silica ingot. As shown in FIG. 9, the polished silica boule 60 has a surface topology with a different appearance than the surface topologies of the different embodiments of sintered glass sheet 28 shown in FIGS. 5 and 6. For example, boule 60 has linear abrasion marks 62 that may be formed during different steps of the boule formation process, during handling and/or during polishing. In addition, the surface topology of boule 60 shown in FIG. 9 has directionality in which surface features extend generally in the direction of movement of the polishing device (extending from the upper left corner toward the bottom right corner in the image shown). In contrast, the surface topology of the embodiments of silica glass sheet 28 shown in FIGS. 5 and 6 exhibit a more random distribution of peaks and valleys with little or no directionality. In such embodiments, silica glass sheet 28 does not include elongate raised or recessed features, wherein the maximum length and maximum width of raised and/or recessed features is less than 10 μm, specifically less than 3 μm and in some embodiments, less than 1 μm, within at least one 0.023 mm$^2$ area.

In some embodiments, silica glass sheet 28 may have bulk curvature or warp such that the opposing major surfaces of silica glass sheet 28 deviate somewhat from a planar configuration. As shown in FIGS. 8A-8C in some embodiments, one of the major surfaces of silica glass sheet 28 has concave shape extending across the width of sheet 28 such that the center of one of the major surfaces of sheet 28 is positioned lower than the lateral edges of sheet 28. In various embodiments, the warp of sheet 28 is between 0.5 mm and 8 mm as measured within an area of 3750 mm$^2$. In a example, the warp of a sample of sheet 28 was measured and taken from the Werth gauge on sheet 28 having dimensions 50 mm×75 mm. In another embodiment, the warp of sheet 28 is less than 20 μm across a 150 mm×150 mm square area.

In various embodiments, silica glass sheet 28 has two major surfaces, the upper surface formed from the portion of soot sheet 20 facing soot burner 16, and the lower surface formed from the portion of soot sheet 20 which is in contact with drum 12. In various embodiments, either the upper surface or the lower surface or both of silica glass sheet 28 may have any of the characteristics discussed herein. In specific embodiments, upper surface of silica glass sheet 28 may have the surface characteristics discussed herein, and the lower surface has surface configuration, topology, roughness, surface chemistry, etc. that is different from the upper surface resulting from the contact with drum 12. In a specific embodiment, the lower surface of silica sheet has a roughness (Ra) that is greater than that of the upper surface, and the Ra of the lower surface of silica glass sheet 28 may be between 0 and 1 μm. In another embodiment, lower surface of silica sheet 28 has a roughness (Ra) that is less than that of the upper surface, and in such embodiments, cleaning of the soot deposition surface (e.g., surface 14 of drum 12) following removal of the soot sheet may result in the high level of smoothness of the lower surface of silica sheet 28.

In various embodiments, laser 24 may be controlled in various ways to form a fully sintered or partially sintered glass sheet 28 having different characteristics, layers and/or surface structures. Starting with a porous body such as soot sheet 20, it is possible to obtain a different porosity and/or surface topology in a partially or fully sintered sheet by varying the sintering conditions. In one embodiment, a $CO_2$ laser heat source creates a narrow sintering region that can be leveraged to control the porosity and surface topology. In various embodiments, sintering speed, laser type and laser power combinations can be varied based on various characteristics of soot sheet 20 (e.g., material type, thickness, density, etc.), based on requirements of the product utilizing the sintered sheet 28, and/or based on the requirements of downstream processes. In various embodiments, system 10 discussed above can be operated to form sintered sheet 28 with various characteristics. In various embodiments, system 10 can be operated at a sintering speed (e.g., speed of relative movement between the soot sheet and the laser) between 0.5 mm/s and 5 mm/s, and laser 24 may be a $CO_2$ laser having a power between 100 W and 300 W. In some embodiments, soot sheet 20 passes through the laser sintering region of laser 24 a single time, and in other embodiments, soot sheet 20 passes through the laser sintering region of laser 24 multiple times.

Figure 10:
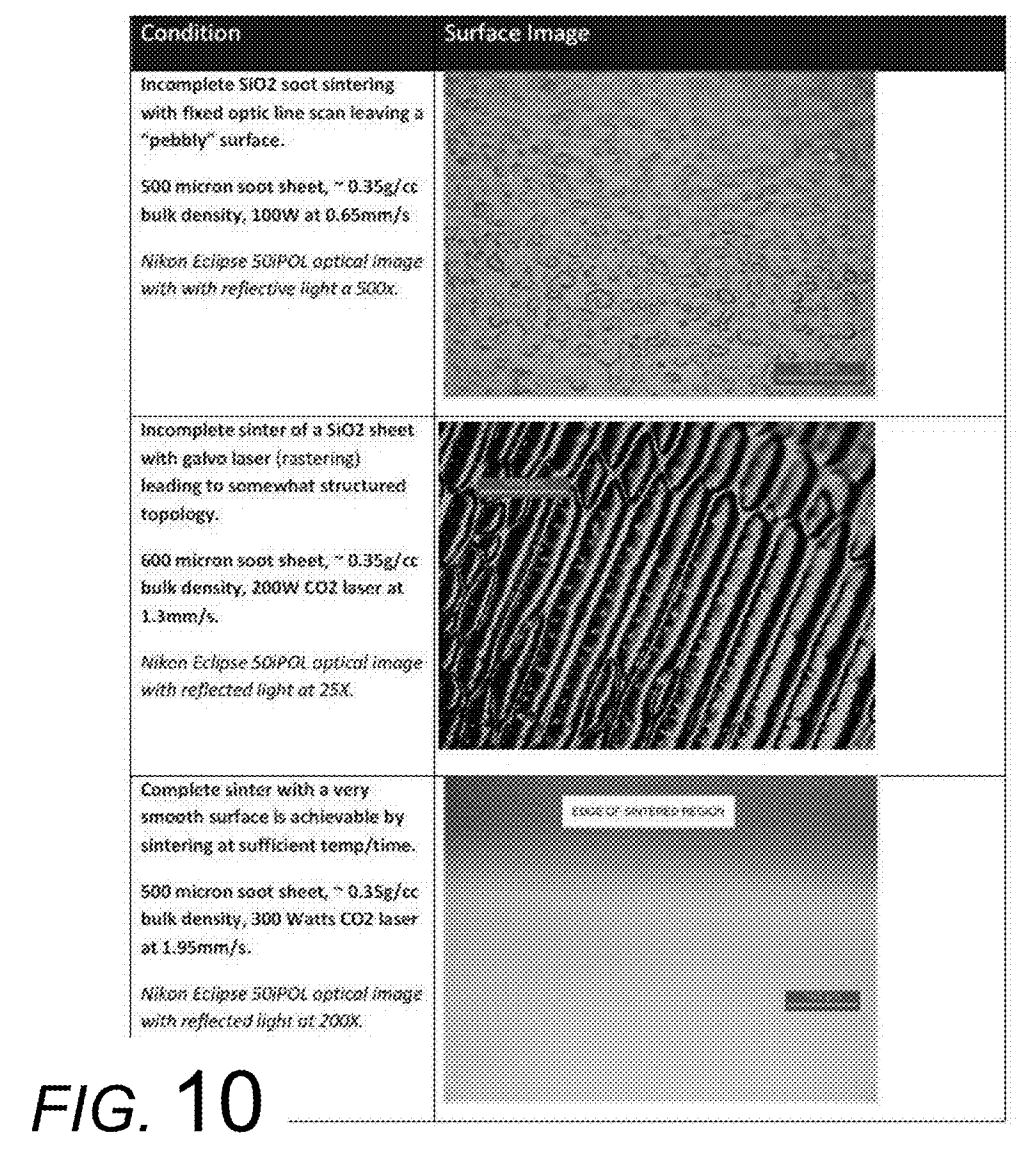

FIG. 10 provides examples of different structures that can be formed under different sintering conditions. As shown in the top pane of FIG. 10, a partially sintered glass sheet having a speckled surface structure can be formed by sintering a 500 micron soot sheet 20, having a bulk density of 0.35 g/cc, using 100 W $CO_2$ laser 24 generating an elongate laser beam (such as beam 42 in FIG. 2) with sintering speed (e.g., speed of relative movement between the soot sheet and the laser) of 0.65 mm/s. As shown in the middle pane of FIG. 10, a partially sintered glass sheet having more organized and linear surface structure can be formed by sintering a 500 micron soot sheet 20, having a bulk density of 0.35 g/cc, using 200 W $CO_2$ scanning laser 24 (e.g., as discussed above regarding FIG. 1) with a sintering speed (e.g., speed of relative movement between the soot sheet and the laser) of 1.3 mm/s. As shown in the bottom pane of FIG. 10, a fully sintered glass sheet having a smooth surface (as discussed herein) can be formed by sintering a 500 micron thick embodiment of soot sheet 20, having a bulk density of 0.35 g/cc, using 300 W $CO_2$ scanning laser 24 with sintering speed (e.g., speed of relative movement between the soot sheet and the laser) of 1.95 mm/s.

Further, in various embodiments, laser 24 may be controlled in various ways to form a fully sintered or partially sintered glass sheet 28 in which only a portion of soot sheet 20 is sintered such that a layer of sintered silica is supported by a lower layer of unsintered soot. In various embodiments, the remaining layer of soot may be removed prior to use of the sintered layer of silica, and in other embodiments, the remaining layer of soot may remain with the sintered layer of silica. In various embodiments, laser 24 may be controlled in various ways to form fully sintered structures within portions of unsintered soot. In some embodiments, sintered columns and/or hollow sintered tubes may be formed in soot sheet 20.

In some embodiments, sintered silica glass sheet 28 consists of at least 99.9% by weight, and specifically at least 99.99% by weight, of a material of the composition of $(SiO_2)_{1-x-y} \cdot M'_x M''_y$, where either or both of M' and M" is an element (e.g., a metal) dopant, or substitution, which may be in an oxide form, or combination thereof, or is omitted, and where the sum of x plus y is less than 1, such as less than 0.5, or where x and y are 0.4 or less, such as 0.1 or less, such as 0.05 or less, such as 0.025 or less, and in some such embodiments greater than $1 \times 10^{-6}$ for either or both of M' and M". In certain embodiments, sintered silica glass sheet 28 is crystalline, and in some embodiments, sintered silica glass sheet 28 is amorphous.

In various embodiments, sintered silica glass sheet 28 is a strong and flexible substrate which may allow a device made with sheet 28 to be flexible. In various embodiments, sintered silica glass sheet 28 is bendable such that the thin sheet bends to a radius of curvature of at least 500 mm without fracture when at room temperature of 25° C. In specific embodiments, sintered silica glass sheet 28 is bendable such that the thin sheet bends to a radius of curvature of at least 300 mm without fracture when at room temperature of 25° C., and more specifically to a radius of curvature of at least 150 mm without fracture when at room temperature of 25° C. Bending of sintered silica glass sheet 28 may also help with roll-to-roll applications, such as processing across rollers in automated manufacturing equipment.

In various embodiments, sintered silica glass sheet 28 is a transparent or translucent sheet of silica glass. In one embodiment, sintered silica glass sheet 28 has a transmittance (e.g., transmittance in the visual spectrum) greater than 90% and more specifically greater 95%. In various embodiments, the sintered silica glass sheets discussed herein have a softening point temperature greater than 700° C. In various embodiments, the sintered silica glass sheets discussed herein have a low coefficient of thermal expansion less than $10 \times 10^{-7}/°$ C. in the temperature range of about 50 to 300° C.

While other sintering devices may be used to achieve some embodiments, Applicants have discovered advantages with laser sintering in the particular ways disclosed herein. For example, Applicants found that laser sintering may not radiate heat that damages surrounding equipment which may be concerns with sintering via induction heating and resistance heating. Applicants found that laser sintering has good control of temperature and repeatability of temperature and may not bow or otherwise warp sheet 28, which may be a concern with flame sintering. In comparison to such other processes, laser sintering may provide the required heat directly and only to the portion of the soot sheet needing to be sintered. Laser sintering may not send significant amounts of contaminates and gases to the sintering zone, which may upset manufacturing of the thin sheets. Further, laser sintering is also scalable in size or for speed increases.

In various embodiments, the silica soot sheets disclosed herein are formed by a system that utilizes one or more glass soot generating device (e.g., a flame hydrolysis burner) that is directed or aimed to deliver a stream of glass soot particles on to a soot deposition surface. As noted above, the silica sheets discussed herein may include one or more dopant. In the example of a flame hydrolysis burner, doping can take place in situ during the flame hydrolysis process by introducing dopant precursors into the flame. In a further example, such as in the case of a plasma-heated soot sprayer, soot particles sprayed from the sprayer can be pre-doped or, alternatively, the sprayed soot particles can be subjected to a dopant-containing plasma atmosphere such that the soot particles are doped in the plasma. In a still further example, dopants can be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements. In various embodiments, the silica soot particles may be doped with a variety of materials, including germania, titania, alumina, phosphorous, rare earth elements, metals and fluorine.

Example 1

A 400 micron thick soot sheet, composed of essentially 100% silica, was prepared using the process as described in U.S. Pat. No. 7,677,058. A section of soot sheet 9 inches wide by 12 inches long was laid on a translating table in proximity to a $CO_2$ laser. The laser was a 400 W $CO_2$ laser, model number E-400, available from Coherent Inc. An asymmetric aspherical lens was positioned between the laser and the soot sheet. The asymmetric aspherical lens generates a line beam of 10 mm long and approximately 1 mm wide with uniform intensity distribution across both long and short axis. The lens was placed roughly 380 mm away from the soot sheet. A laser power of 18 watts of power was used. The soot sheet was moved at 1.25 mm/sec across the beam. Clear, sintered glass, fully densified, was created in the path of the beam. The sintered sheet had a surprisingly low amount of distortion as the soot was densified and shrunken away from the remaining soot sheet. In other sintering systems, the soot sheet would bend and deform unless held flat in a plane during the sinter process.

Example 2

Example 2 is the same as Example 1, except that the soot sheet was translated at 1.5 mm/sec. This produced a partially densified layer of glass atop of unsintered soot sheet.

Example 3

Example 3 is the same as Example 1, except that the essentially 100% silica soot sheet was solution doped to provide a small doping of Yb in the silica matrix, when sintered with the laser.

A reason for difference in fictive temperature may be that melting and cooling of the edge section 112 with the laser 114 according to methods disclosed herein may differ from the process used to heat/cool the rest of the sheet 110, sufficient to establish a "fingerprint." For example, a thin silica sheet cut from a boule and then cut with laser to form edge sections as described herein may have a particularly noticeable difference in fictive temperatures of the centroid and edge surfaces. Toughness and crack mitigation performance may be influenced by and/or related to fictive temperature where different thermal treatments may provide better performances.

Through empirical ring-on-ring testing, Applicants found evidence to suggest laser sintering processes disclosed herein may improve strength of respective thin silica sheets relative to conventional silica sheets cut from a boule and polished. Applicants believe this may be due to presence of residual stresses and/or surface crack initiation sites of the boule cut sheets that are not present or removed on silica sheets as disclosed herein made by methods disclosed herein.

Applicants further discovered that specific laser movement patterns, settings, and/or operating conditions may be used during the sintering process to achieve particular surface attributes for high purity fused silica sheets as disclosed herein. For example, line scanning of a laser beam may produce rolling peaks and valleys along a surface of the respective silica sheet, while rapid polygonal rastering may produce micro-crenellations, as described below.

Figure 11:
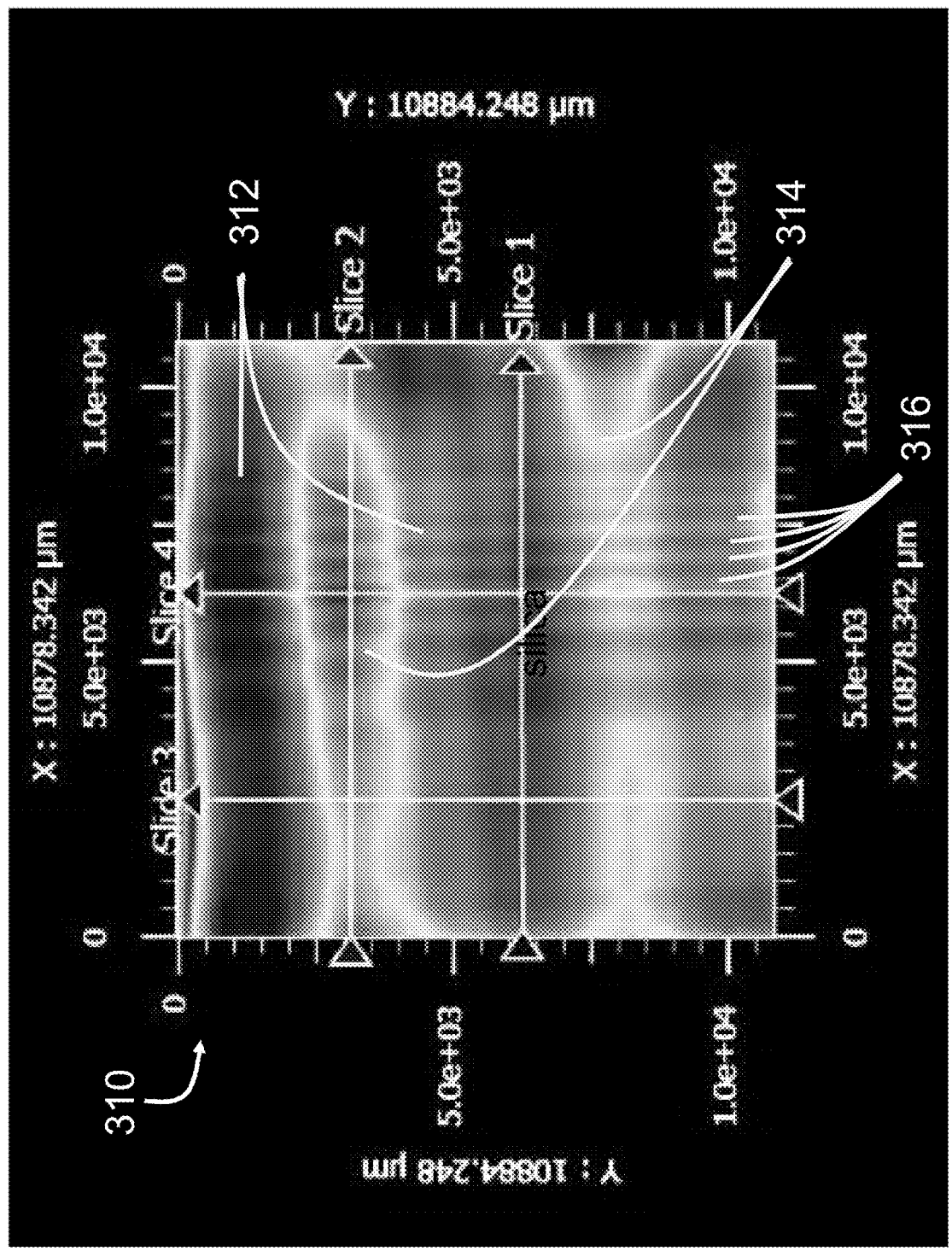
FIG. 11 is a three-dimensional surface profile from a vertical perspective of a glass sheet according to an exemplary embodiment.
Figure 12:
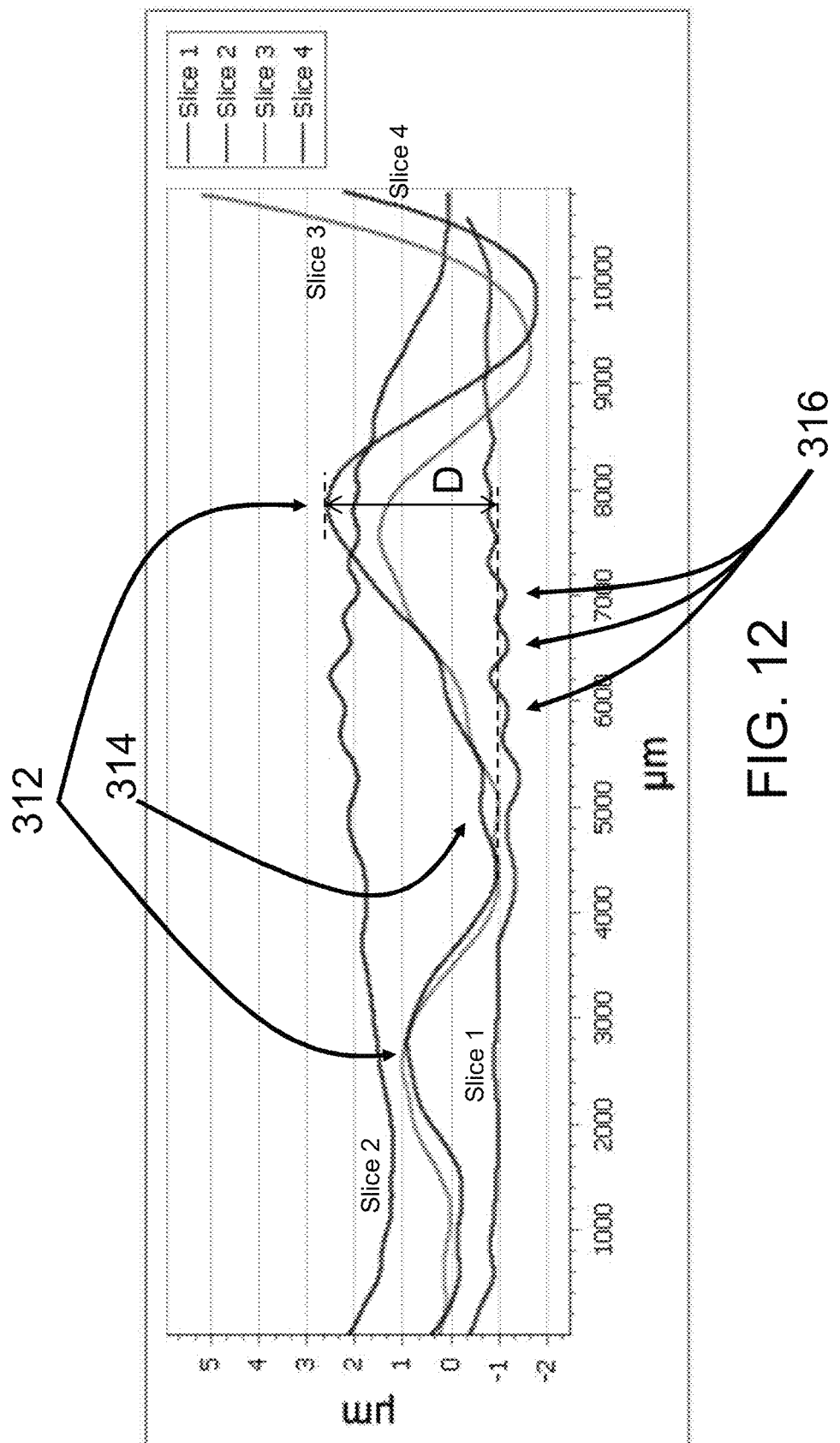
FIG. 12 is a diagram of two-dimensional surface profiles from the three-dimensional surface profile of FIG. 11.
Figure 13:
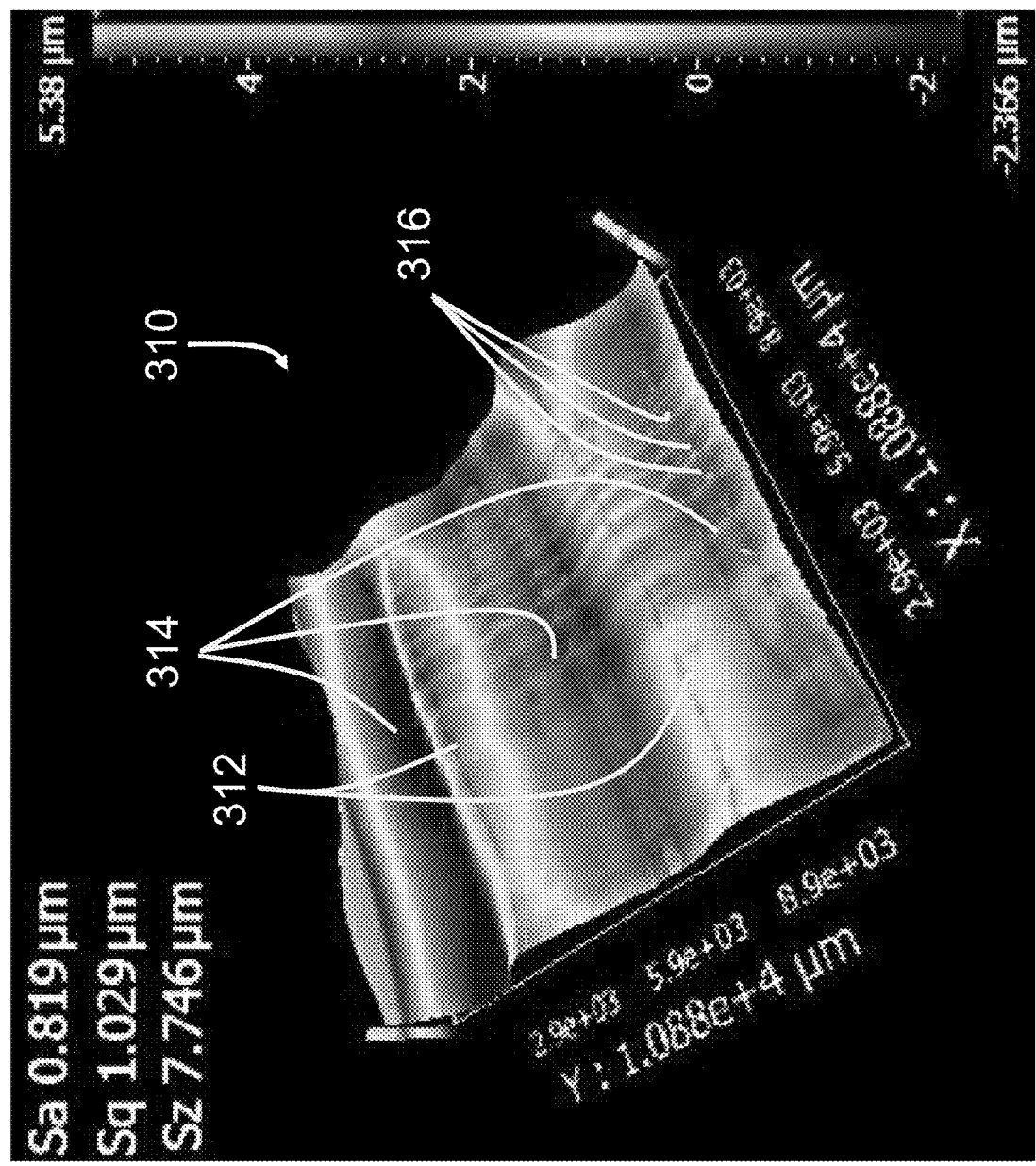
FIG. 13 is the three-dimensional surface profile of FIG. 11 from a perspective view.

Referring to FIGS. 11-13, a thin high purity fused silica sheet 310, having a thickness of 500 μm or less, was produced from a sheet of silica soot using line scanning laser sintering. The sheet 310 includes rolling peaks 312 and valleys 314 along a surface of the respective glass sheet 310. As can be seen from the two-dimensional plots of the curves, the peaks 312 adjoining a valley 314 are spaced apart from one another by a distance that is at least 1000 μm, such as at least 2000 μm, at least 4000 μm, as measured from the tops of each peak 312. Depth D of the valley relative to the height of the higher of the adjoining peaks is at least 1 μm, such as at least 1.5 μm, at least 2 μm. Small bumps along the surface between the adjoining peaks are distinguished from the local peaks because they are far smaller in amplitude, i.e., outside of the described range for D. The respective peaks and valleys 312, 314 extend lengthwise along the surface of the sheet 310 for a distance of at least 1 mm (see, e.g., horizontal direction in FIG. 11, direction of Slices 1 and 2), such as at least 5 mm, or more depending upon the size of the sheet 310 among other factors, for example.

As can be seen in FIGS. 11-13, the sheet 310 further includes furrows 316 generally perpendicular to the length of the peaks and valleys 312, 314. While Applicants attribute the peaks and valleys 312, 314 to the laser sintering pattern, Applicants attribute the furrow lines to variations in the width of the silica soot sheet used to form the high purity fused silica sheet. During the process of forming the silica soot sheet, soot streams from the hydrolysis process may deposit the soot in a depth corresponding to proximity to local nozzles, which may be uneven. The result may be furrows 316, as shown in FIG. 12.

While the sheet 310 of FIGS. 11-13 was made with a line scanning laser sintering process, other embodiments of the disclosure relate to a method of sintering a high purity fused silica glass sheet 410 that includes a step of rastering a beam of a laser across a sheet of high purity fused silica soot; where a pattern of the rastering includes tightly spacing target locations on the sheet 410 such that the laser sinters the soot and simultaneously forms micro-crenellations on a first major surface of the sheet 410 when viewed in cross-section. As used herein, rastering refers to general sweeping movement across a surface of a laser beam for sintering, such as in a pattern of relative motion, for example generally back and forth motion, polygonal spiral looping motion, etc. In some embodiments, the pattern of the rastering includes moving the beam of the laser in general polygon shapes, where vertices of the polygon shapes are rounded. For example, silica sheets 410, 610 were made with such a laser sintering process.

Figure 14:
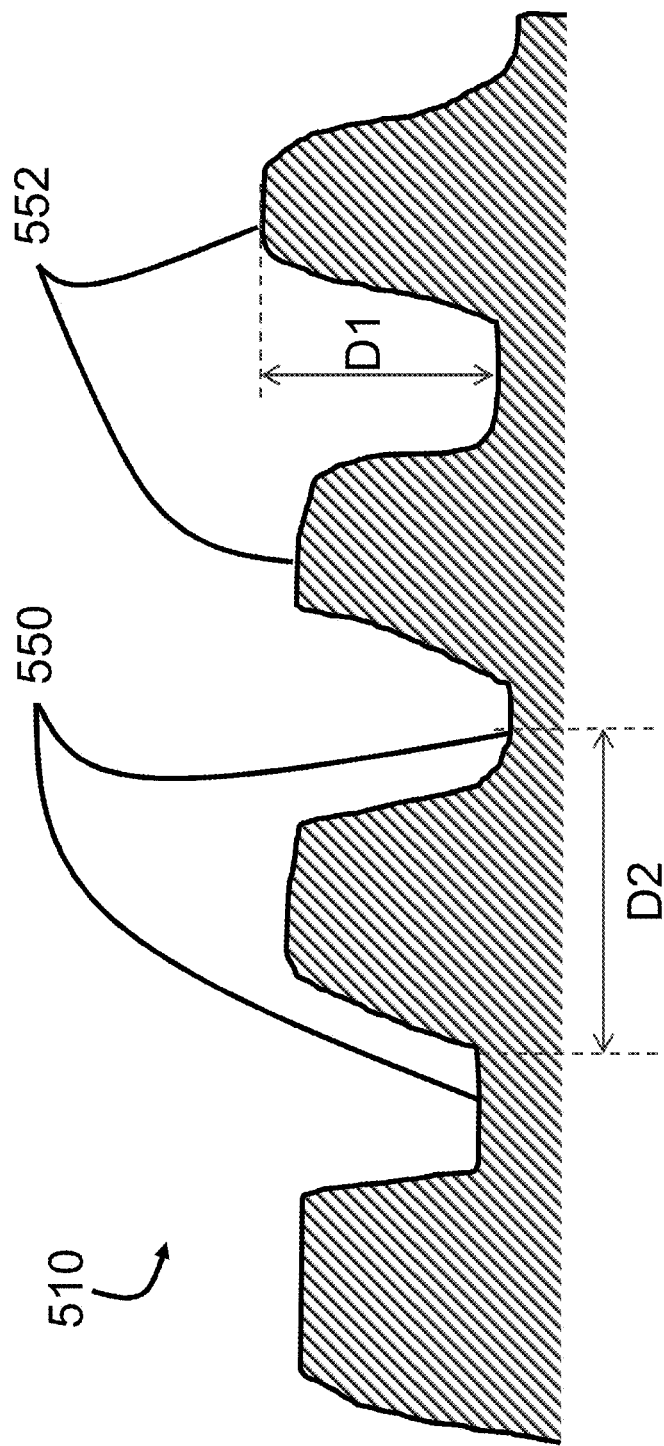
FIG. 14 is a conceptual diagram of micro-crenellations according to an exemplary embodiment.

FIG. 14 conceptually shows a surface 510 of a glass sheet, as disclosed herein, and corresponding tiny notches 550 and caps 552, adjoining and between the notches 550, as may be produced by sintering methods and techniques disclosed herein. The tiny notches 550 each have a depth D1, which may be measured using standard profilometry relative to the higher of adjoining caps 552 on either side of the notch 550. For example, the depth D1 of such tiny notches on silica sheets 410, 610 is at least 25 nm and no more than 1 μm.

According to an exemplary embodiment, the notches 550 are crenellated or form "micro-crenellations" such that at least some of the notches have generally flat bottom surfaces and at least some respective adjoining caps have generally plateau top surfaces offset from the bottom surfaces by steeply-angled sidewalls. The notches 550 correspond with bottom surfaces of the micro-crenellations and the caps 552 correspond to the top surfaces. The surfaces of the notches 550 and caps 552 may be distinguished from the sidewalls at edges of the top and bottom surfaces by changes in angle of the respective surface, where "steeply-angled" means that if the bottom and/or top surfaces are generally aligned with a horizontal plane, the sidewalls are generally aligned with a plane that is within 30-degrees of vertical.

Figure 15:
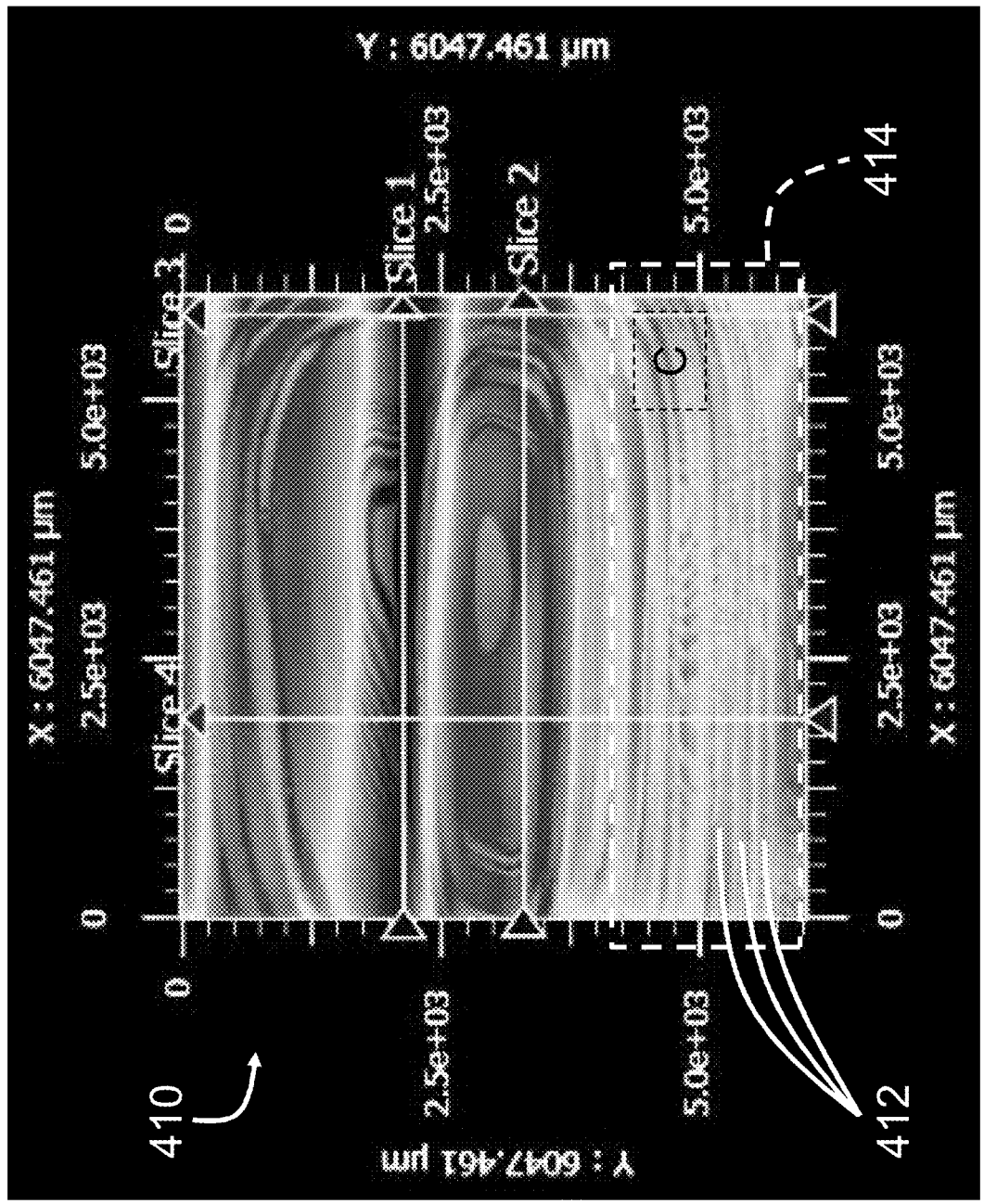
FIG. 15 is a three-dimensional surface profile from a vertical perspective of a glass sheet according to another exemplary embodiment.
Figure 16:
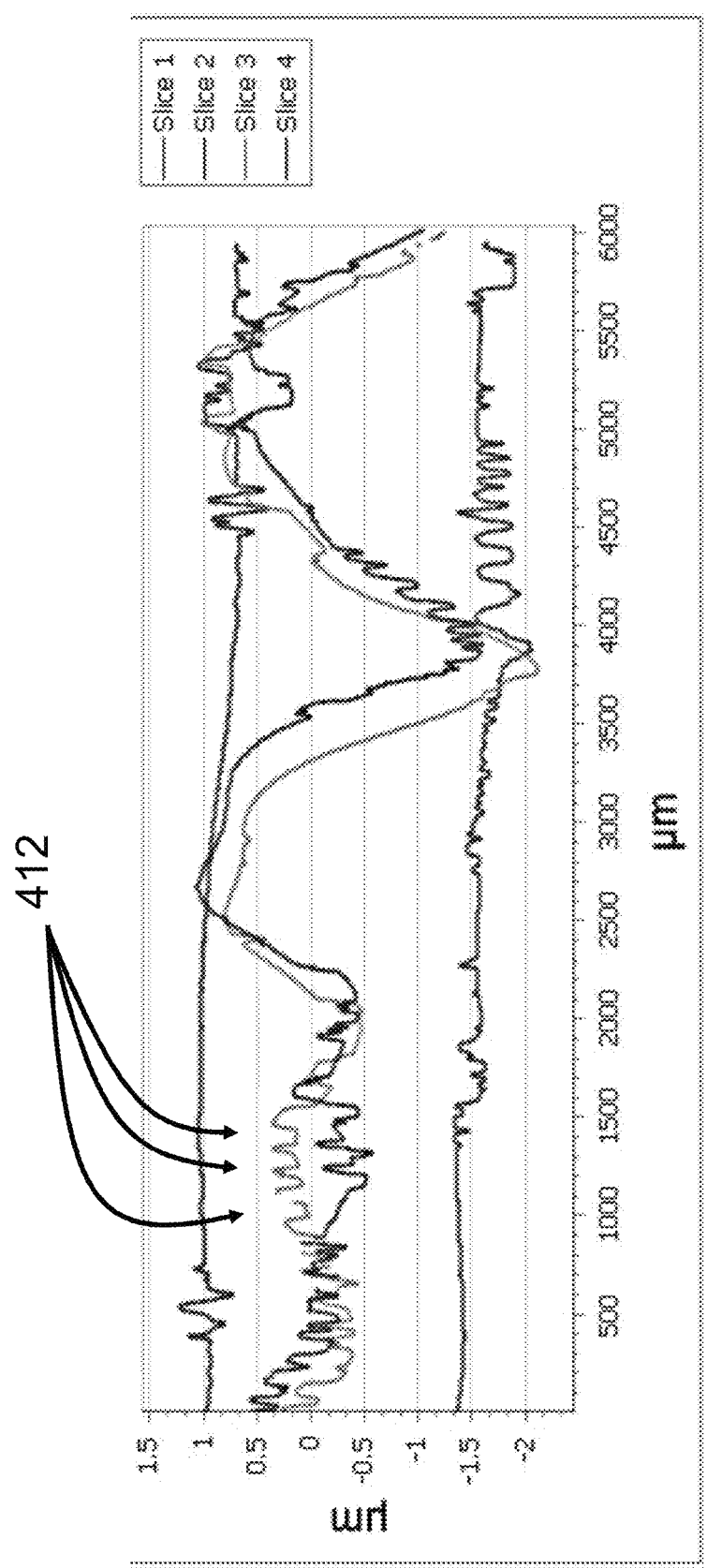
FIG. 16 is a diagram of two-dimensional surface profiles from the three-dimensional surface profile of FIG. 15.
Figure 17:
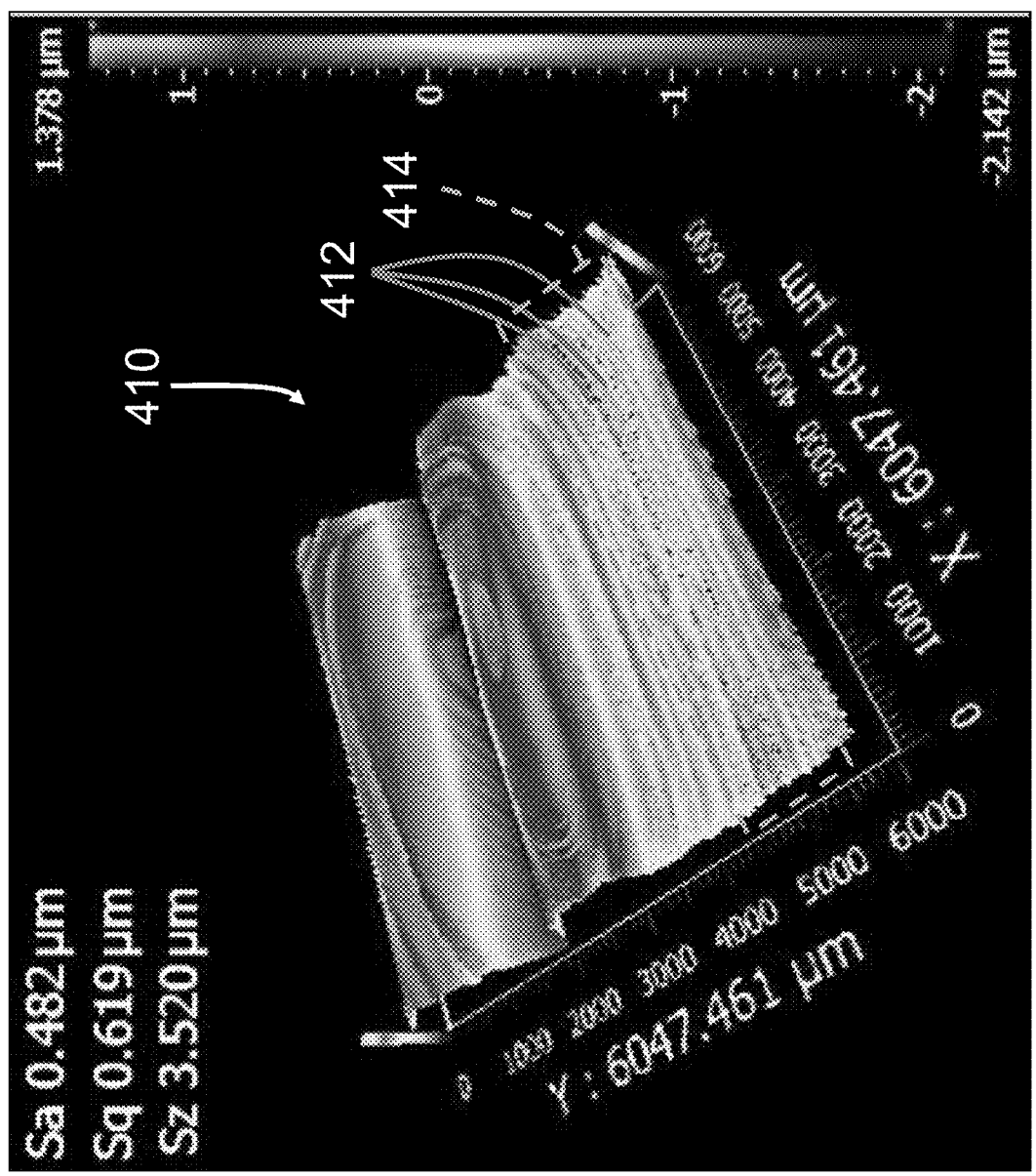
FIG. 17 is the three-dimensional surface profile of FIG. 15 from a perspective view.

Referring to FIGS. 15-17, silica sheet 410 includes tiny notches 412 each with a depth that is no more than 500 nm measured relative to the higher of adjoining local caps on either side of the respective notch 412. According to an exemplary embodiment, the notches 412 each have a width between adjoining local caps that is at least 5 µm and no more than 500 µm. In some embodiments, the notches 412 each have a width between local caps that is at least 50 µm. The notches 412 each have a length of at least 500 µm, such as at least 1000 µm, as shown in FIG. 14 (horizontal direction, direction of Slices 1 and 2). In some embodiments, the notches each have a length of at least 2500 µm.

According to an exemplary embodiment, the micro-crenellations 414 are grouped together side-by-side in a swath 414 along the surface. Dimensions of the swath 414 are defined by the outermost notches 412 of the respective grouping, where the distance D2 (see generally FIG. 14) between adjacent notches 412 in the grouping, as measured from the maximum depth of each notch 412, is no more than 500 µm, such as no more than 300 µm and/or at least 25 µm, such as at least 50 µm. According to an exemplary embodiment, the swath 414 is at least 1 mm wide and 2 mm long, and the swath 414 includes at least 10 of the tiny notches 412. In some embodiments, the swath 414 includes at least 15 tiny notches 412.

In some such embodiments, the pattern of the micro-crenellations is such that at least three notches 412 are side-by-side-by-side with one another in a row, when the sheet 410 is viewed in cross-section, each notch 412 having a depth that is within 20 percent of an average depth of the three notches 412, and/or at least five such adjoining notches 412 that have a depth that is within 20 percent of an average depth of the five. Uniformity of the notch 412 sizing and geometry may indicate the process used for manufacturing the respective sheet 410 and may provide improved consistency and predictability of performance of the sheet 410, relative to less uniform sheets.

Comparing microstructures of FIGS. 11-13 with FIGS. 15-17, caps and notches 412 of the sheet 410 differ from peaks 312 and valleys 314 in terms of general scale and shape of the respective surface features. Micro-crenellations are generally tooth-shaped, with generally sharp and/or jagged sides (see, generally notches 550 and caps 552 of FIG. 14). The notches 412 and caps tend to have flat or horizontal surfaces while the peaks and valleys 312, 314 are smoothly rolling and rounded without discontinuities, edges, corners. These differences may be attributed to differences in application of the laser beam during the sintering processes, as described above.

Applicants have discovered that close placement of notches 412 forming micro-crenellations, as disclosed herein, may overwrite and/or remove furrows (see, e.g., furrows 316 of FIG. 11) from sintering of soot sheets with uneven soot depositions. In some such embodiments, the result may be a less wavy surface and a generally flatter geometry. Further, using rastering of polygonal beam patterns to generate micro-crenellations may remove a source of stiffness of the sheet by removing the furrows, potentially allowing improved flexibility when bending about an axis aligned with the micro-crenellations, especially if the micro-crenellations generally extend along a straight path.

In other embodiments, the tiny notches 412 of the micro-crenellations curve along the length thereof, meaning that the notches extend lengthwise along a path that curves. For example, in some such embodiments, the curve turns at least 10-degrees off of a straight line (see, e.g., curve C in FIG. 14). In some embodiments, notches 412 of the micro-crenellations at the general location of such a turn maintain separation from one another about the turn, meaning that the notches 412, in general, do not merge into one another. In some embodiments, the curve along the path of the notches 412 of the micro-crenellations includes a turn of at least 90-degrees. In some embodiments, the curve generally forms a polygon with rounded vertices. In other embodiments, the notches do not curve, or curves may be removed from the sheet by cutting out sections having curved notches.

Figure 18:
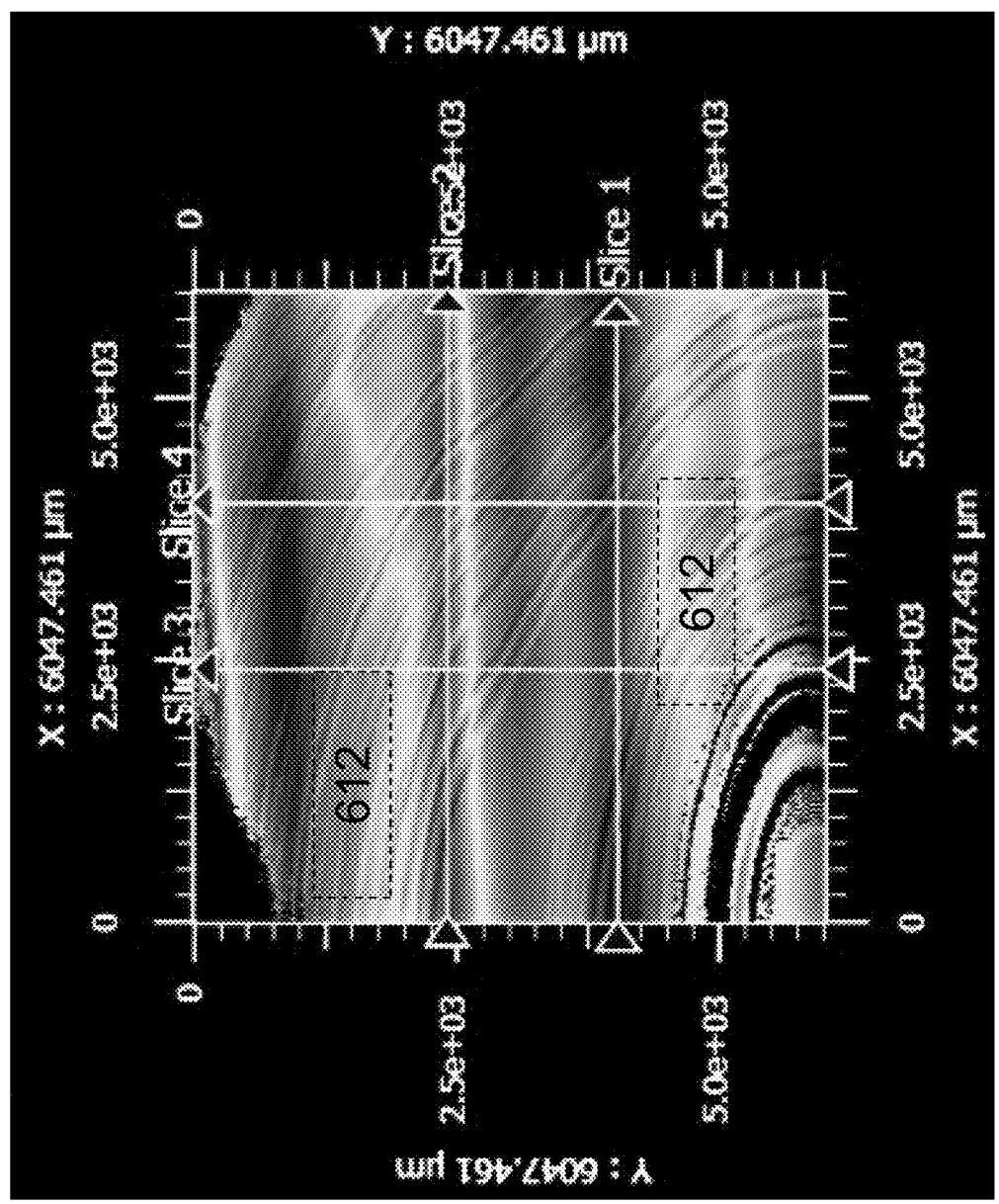
FIG. 18 is a three-dimensional surface profile from a vertical perspective of a glass sheet according to yet another exemplary embodiment.
Figure 19:
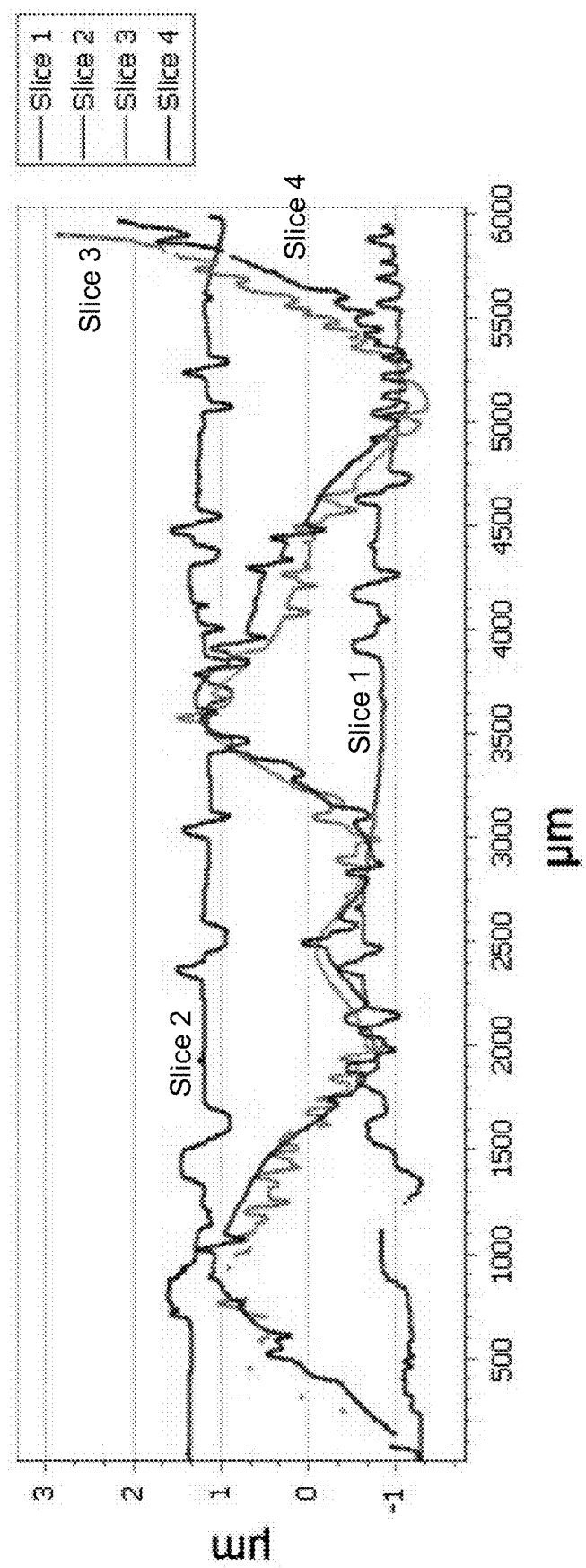
FIG. 19 is a diagram of two-dimensional surface profiles from the three-dimensional surface profile of FIG. 18.
Figure 20:
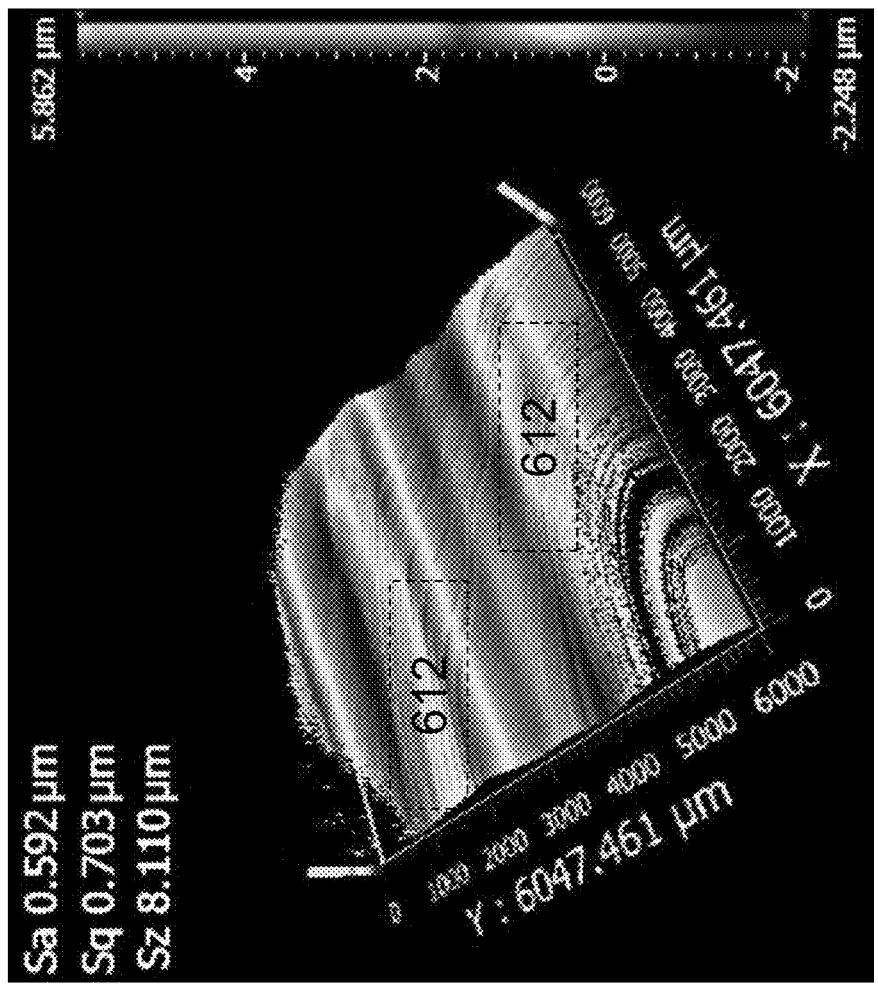
FIG. 20 is the three-dimensional surface profile of FIG. 18 from a perspective view.

Referring to FIGS. 18-20, a high purity fused silica glass sheet 610 is at least 99.9 mole % silica, where the silica is at least generally amorphous, having less than 1% crystalline content by weight. The sheet 610 has an average thickness between major surfaces of less than 500 µm. When viewed in cross-section, as shown in FIG. 19, the major surface has tiny notches 612 along the major surface. The tiny notches 612 each have a depth that is at least 25 nm and no more than 1 µm measured relative to a higher one of adjoining local caps on either side of the respective notch. The tiny notches each have a width between adjoining local caps that is at least 5 µm. The tiny notches each have a length of at least 500 µm. Those features without such attributes are not "notches" of the sheet 610. As shown in FIG. 19, the notches are crenellated such that at least some of the notches have generally flat bottom surfaces and at least some respective adjoining caps have generally plateau top surfaces offset from the bottom surfaces by steeply-angled sidewalls.

Referring now to FIG. 18, Applicants believe high purity fused silica has good attributes for substrates in electronic devices because of associated dimensional stability and dielectric properties, among other attributes, allowing such devices to become more compact and energy efficient. However, bonding of metal layers to conventional silica sheets may be difficult due to differences in respective thermal expansion rates, which may result in delamination after temperature changes. In FIG. 18, an electronic device 810, such as a printed circuit board, an antenna, or other such device, includes a substrate 812 (e.g., interposer, board) including a high purity fused silica glass sheet 814, as disclosed herein.

In some such embodiments, the high purity fused silica sheet 814 has micro-crenellations 816 on a major surface 818. Micro-crenellations 816 may be useful for various reasons, such as to facilitate or strengthen bonding with a thin conductive layer 820 (e.g., metals containing copper, aluminum, gold), such as by increasing interfacial surface area and/or orthogonal surface area to the interface, which may mitigate delamination effects due to shear forces that stem from different thermal expansion rates of the silica sheet 814 and conductive layer 820.

The conductive layer 820 may be sputtered or otherwise deposited onto the substrate so that portions of the conductive layer 820 fill into the notches of the micro-crenellations 816. According to an exemplary embodiment, the underside of the conductive layer 820 facing the micro-crenellations 816 is textured in a pattern that inversely relates to geometry of the micro-crenellations 816 such that caps on the major surface 818 correspond to notches on the underside of the conductive layer 820 and notches on the underside of the conductive layer 820 correspond to caps on the major surface 818.

Figure 21:
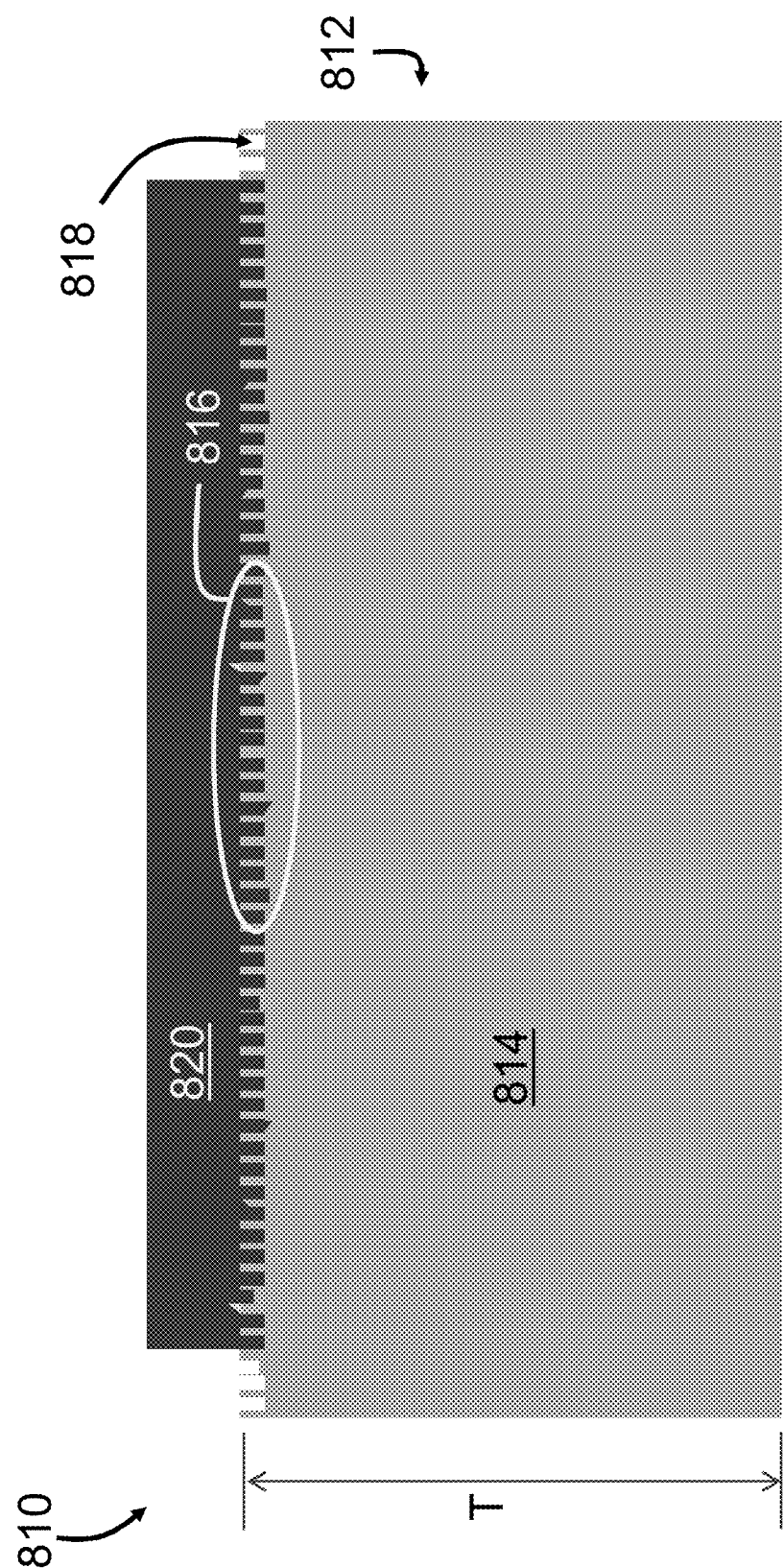
FIG. 21 is a conceptual diagram of an electronic device according to an exemplary embodiment.

While the substrate 812 is shown as the high purity fused silica glass sheet 814 in FIG. 21, in other contemplated embodiments, the high purity fused silica glass sheet 814 may be coated with another material, such as an adhesion promoter or material with intermediate thermal expansion properties to facilitate bonding between the high purity fused silica sheet 814 and the conductive later 820. Accordingly, the metal layer 820 of the electronic device 810 is coupled to the substrate 812 and overlaying the micro-crenellations 816, the conductive layer 820 may be coupled directly or indirectly, by way of intermediate layers, to the substrate 812 and/or high purity fused silica glass sheet 814.

According to an exemplary embodiment, the thin substrate 812 and/or the high purity fused silica glass sheet 814 has a thickness T of 1000 µm or less, such as 500 µm or less, such as 200 µm or less. According to an exemplary embodiment, the high purity fused silica sheet 814 has a porosity of less than 10% by volume, such as less than 5%, such as less than 2%. In other contemplated embodiments, the high purity fused silica sheet 814 has greater porosity. Where porosity corresponds to gaps, voids, or bubbles where the silica is not present, but gases or other materials may be present.

Applicants believe curvature C (see FIG. 15) along the length of the notches 412, 612 and corresponding micro-crenellations 816 may improve bonding of materials, such as the conductive layer 820 or coatings or other materials, to the surface 818 of the silica sheets 410, 612, 814 by providing surface features on the major surface 818 in opposition to shear forces in multiple directions along the major surface 818, such as opposed to micro-crenellations that are only straight.

Applicants note that the fused silica glass sheet 110 and others disclosed herein, in some applications or uses, may be coated with additional materials that may not be silica and/or may be joined or otherwise coupled to additional or different materials. In some contemplated embodiments, glass sheets, otherwise identical to sheet 110, are of at least 99% by weight of a glass of the composition of $(SiO_2)_{1-x-y}M'_xM''_y$, where either or both of M' and M'' is an element, dopant, or substitution, which may be in an oxide form, or combination thereof, or is omitted, and where the sum of x plus y is less than 1, such as less than 0.5, and/or where x and y are 0.1 or less, such as 0.05 or less, such as 0.025 or less, and in some such embodiments greater than $10 \times 10^{-7}$ for either or both of M' and M''.

In contemplated embodiments, silica sheets otherwise as disclosed herein may be doped with dopants that include elements from groups IA, IB, IIA, IIB, IIIA, IIIB, IVA, IVB, VA, VB, and/or the rare earth series of the periodic table of elements, for example, by introducing dopant precursors into flame hydrolysis burners. In contemplated embodiments, glass sheets as described herein have at least 50 mole % $SiO_2$, which may be compounded with other elements or molecules, such as at least 70 mole % $SiO_2$, or 90 mole % $SiO_2$.

In some embodiments, the high purity fused silica is amorphous, which, as used herein, means no more than 1% crystal content by weight. In some contemplated embodiments, the sheet may be crystalline quartz and/or a glass-ceramic, having crystal content, such as at least 1% by weight.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A high purity fused silica glass sheet, comprising:
   a first major surface;
   a second major surface opposite the first major surface;
   at least 99.9 mole % silica, wherein the silica is at least generally amorphous, having less than 1% crystalline content by weight; and
   an average thickness between the first major surface and the second major surface of less than 500 um;
   wherein the first major surface, in cross section, has tiny notches along the first major surface, wherein at least ten of the tiny notches have:
   a depth that is at least 25 nm and no more than 1 um measured relative to a higher one of adjoining local caps on either side of the respective notch,
   a width between adjoining local caps that is at least 5 um, and
   a length of at least 500 um;
   wherein the tiny notches curve along the length thereof, and
   wherein the notches are crenellated such that at least some of the notches have generally flat bottom surfaces and at least some respective adjoining caps have generally plateau top surfaces offset from the bottom surfaces by steeply-angled sidewalls.

\* \* \* \* \*